US010649611B2

(12) United States Patent
Rauschenbach et al.

(10) Patent No.: US 10,649,611 B2
(45) Date of Patent: May 12, 2020

(54) OBJECT PAGES IN MULTI APPLICATION USER INTERFACE

(71) Applicant: SAP SE, Walldorf (DE)

(72) Inventors: Tina Rauschenbach, Mannheim (DE); Kai Richter, Muehltal (DE); Ioannis Grammatikakis, Maxdorf (DE); Florian Jann, Heidelberg (DE); Andreas Hoffner, Oestringen (DE)

(73) Assignee: SAP SE, Walldorf (DE)

(*) Notice: Subject to any disclaimer, the term of this patent is extended or adjusted under 35 U.S.C. 154(b) by 231 days.

(21) Appl. No.: 15/462,072

(22) Filed: Mar. 17, 2017

(65) Prior Publication Data

US 2017/0329479 A1 Nov. 16, 2017

Related U.S. Application Data

(60) Provisional application No. 62/335,888, filed on May 13, 2016, provisional application No. 62/335,892, (Continued)

(51) Int. Cl.
*G06F 3/0481* (2013.01)
*G06F 3/0484* (2013.01)
(Continued)

(52) U.S. Cl.
CPC ........ *G06F 3/04812* (2013.01); *G06F 3/0481* (2013.01); *G06F 3/0482* (2013.01); (Continued)

(58) Field of Classification Search
CPC ....... G06F 3/04812; G06F 9/451; H04L 67/02
See application file for complete search history.

(56) References Cited

U.S. PATENT DOCUMENTS 5,097,533 A 3/1992 Burger et al.
5,517,663 A 5/1996 Kahn
(Continued)

OTHER PUBLICATIONS

"SAP Blog Part 1", Ferriero, S. (May 9, 2016), How to create smart Templates annotations within CDS views—Part 1. [Retrieved Oct. 8, 2018] https://blogs.sap.com/2016/05/09/how-to-create-smart-templates-annotations-within-cds-views-part-1 (17 pages).
(Continued)

*Primary Examiner* — Roland J Casillas
(74) *Attorney, Agent, or Firm* — Fish & Richardson P.C.

(57) ABSTRACT

A system for presenting a common user interface (UI) of multiple applications on diverse client computing devices as a web page that includes a set of UI elements leading to the multiple applications. The diverse client computing devices have display screens of diverse sizes. In the system, backend servers host a UI infrastructure including the common UI and one or more object page floorplans of respective UI object pages representing the multiple applications and representing application information and data on the diverse client computing devices. Design tools are available to process the object page floorplans to display, create, or edit the UI object pages. The object page floorplans include a first object page layout including a title bar, a header, an expanded default state, a navigation control, a content area, and a footer toolbar containing actions that are performed upon a corresponding first UI object page.

18 Claims, 26 Drawing Sheets

Related U.S. Application Data filed on May 13, 2016, provisional application No. 62/335,895, filed on May 13, 2016, provisional application No. 62/335,897, filed on May 13, 2016, provisional application No. 62/335,899, filed on May 13, 2016, provisional application No. 62/335,873, filed on May 13, 2016, provisional application No. 62/335,875, filed on May 13, 2016, provisional application No. 62/335,879, filed on May 13, 2016, provisional application No. 62/335,883, filed on May 13, 2016, provisional application No. 62/335,886, filed on May 13, 2016, provisional application No. 62/335,887, filed on May 13, 2016.

(51) Int. Cl.
| | |
|---|---|
| *G06F 16/242* | (2019.01) |
| *G06F 16/957* | (2019.01) |
| *G06F 40/106* | (2020.01) |
| *G06F 9/451* | (2018.01) |
| *G06F 8/38* | (2018.01) |
| *G06F 3/0482* | (2013.01) |
| *H04L 29/08* | (2006.01) |
| *G06F 3/0485* | (2013.01) |
| *G06F 3/0486* | (2013.01) |

(52) U.S. Cl.
CPC .......... *G06F 3/0484* (2013.01); *G06F 3/0485* (2013.01); *G06F 3/04817* (2013.01); *G06F 3/04845* (2013.01); *G06F 3/04847* (2013.01); *G06F 8/38* (2013.01); *G06F 9/451* (2018.02); *G06F 16/2428* (2019.01); *G06F 16/9577* (2019.01); *G06F 40/106* (2020.01); *H04L 67/02* (2013.01); *G06F 3/0486* (2013.01); *G06F 2203/04803* (2013.01)

(56) References Cited

U.S. PATENT DOCUMENTS

| | | | |
|---|---|---|---|
| 5,657,462 A | 8/1997 | Brouwer | |
| 5,682,469 A | 10/1997 | Linnett | |
| 5,727,950 A | 3/1998 | Cook | |
| 5,754,174 A | 5/1998 | Carpenter | |
| 5,877,759 A | 3/1999 | Bauer | |
| 6,025,841 A | 2/2000 | Finkelstein | |
| 6,085,184 A | 7/2000 | Bertrand | |
| 6,262,730 B1 | 7/2001 | Horvitz | |
| 6,393,495 B1 | 5/2002 | Flory et al. | |
| 6,735,632 B1 | 5/2004 | Kiraly | |
| 6,750,885 B1 | 6/2004 | Finch et al. | |
| 6,751,606 B1 | 6/2004 | Fries | |
| 6,788,313 B1 | 9/2004 | Heil | |
| 6,845,486 B2 | 1/2005 | Yamada | |
| 6,892,349 B2 | 5/2005 | Shizuka | |
| 7,024,417 B1 | 4/2006 | Russakovsky et al. | |
| 7,127,723 B2 | 10/2006 | Endo et al. | |
| 7,275,246 B1 | 9/2007 | Yates et al. | |
| 7,441,190 B2 | 10/2008 | Asami | |
| 7,603,375 B2 | 10/2009 | Ng | |
| 7,636,045 B2 | 12/2009 | Sugiyama | |
| 7,739,310 B1 | 6/2010 | Shmulevich et al. | |
| 7,739,695 B2 | 6/2010 | Wood et al. | |
| 7,797,146 B2 | 9/2010 | Harless | |
| 7,797,338 B2 | 9/2010 | Feng | |
| 7,849,175 B2 | 12/2010 | Beringer et al. | |
| 7,913,183 B2 | 3/2011 | Czerwinski et al. | |
| 7,930,681 B2 | 4/2011 | Kloeffer et al. | |
| 7,933,399 B2 | 4/2011 | Knott | |
| 7,966,269 B2 | 6/2011 | Bauer | |
| 8,225,231 B2 | 7/2012 | Zielinski | |
| 8,978,010 B1 | 3/2015 | Thumfart et al. | |
| 9,032,045 B1 | 5/2015 | Leblang | |
| 9,088,634 B1 | 7/2015 | Corley et al. | |
| 9,164,776 B2 | 10/2015 | Rauh et al. | |
| 9,176,801 B2 | 11/2015 | Baeuerle et al. | |
| 9,202,171 B2 | 12/2015 | Kuhn | |
| 9,223,549 B1 | 12/2015 | Hermanns et al. | |
| 9,225,515 B2 | 12/2015 | Volchok et al. | |
| 9,552,123 B1 | 1/2017 | Johnston | |
| 9,632,985 B1 | 4/2017 | MacInnis et al. | |
| 9,703,458 B2 | 7/2017 | Sasaki | |
| 9,720,889 B1 | 8/2017 | Kobyakov | |
| 9,740,462 B2 | 8/2017 | Rao et al. | |
| 9,807,145 B2 | 10/2017 | Koon | |
| 10,007,936 B1 | 6/2018 | Ghoshal et al. | |
| 10,230,812 B1 | 3/2019 | Ram | |
| 2001/0054066 A1 | 12/2001 | Spitzer | |
| 2002/0005865 A1 | 1/2002 | Hayes-Roth | |
| 2002/0038335 A1 | 3/2002 | Dong et al. | |
| 2002/0046294 A1 | 4/2002 | Brodsky et al. | |
| 2002/0149611 A1 | 10/2002 | May | |
| 2003/0020671 A1 | 1/2003 | Santoro | |
| 2003/0023752 A1 | 1/2003 | Williamson et al. | |
| 2003/0028498 A1 | 2/2003 | Hayes-Roth | |
| 2003/0093508 A1 | 5/2003 | Li et al. | |
| 2003/0154232 A1 | 8/2003 | Beringer et al. | |
| 2003/0163585 A1 | 8/2003 | Elderon et al. | |
| 2004/0056878 A1 | 3/2004 | Lau | |
| 2004/0075677 A1 | 4/2004 | Loyall | |
| 2004/0111701 A1 | 6/2004 | Beust | |
| 2004/0131050 A1 | 7/2004 | Beringer et al. | |
| 2004/0133606 A1 | 7/2004 | Miloushev et al. | |
| 2004/0179659 A1 | 9/2004 | Byrne | |
| 2005/0039127 A1 | 2/2005 | Davis | |
| 2005/0065883 A1 | 3/2005 | Dent et al. | |
| 2005/0065913 A1 | 3/2005 | Lillie et al. | |
| 2006/0010196 A1 | 1/2006 | Laird et al. | |
| 2006/0041848 A1 | 2/2006 | Lira | |
| 2006/0053088 A1 | 3/2006 | Ali et al. | |
| 2006/0053121 A1 | 3/2006 | Zizys et al. | |
| 2006/0074850 A1 | 4/2006 | Bouchet | |
| 2006/0136223 A1 | 6/2006 | Brun | |
| 2006/0235942 A1 | 10/2006 | Gale et al. | |
| 2006/0253791 A1 | 11/2006 | Kuiken | |
| 2006/0271398 A1 | 11/2006 | Belcastro | |
| 2006/0271862 A1 | 11/2006 | Carey et al. | |
| 2007/0067373 A1 | 3/2007 | Higgins et al. | |
| 2007/0083821 A1 | 4/2007 | Garbow | |
| 2007/0168874 A1 | 7/2007 | Kloeffer et al. | |
| 2007/0226241 A1 | 9/2007 | Ng | |
| 2008/0034314 A1* | 2/2008 | Louch | G06F 8/60 715/778 |
| 2008/0096533 A1 | 4/2008 | Manfredi | |
| 2008/0127220 A1 | 5/2008 | Morris | |
| 2008/0155409 A1 | 6/2008 | Santana | |
| 2008/0163099 A1 | 7/2008 | Gu et al. | |
| 2008/0229239 A1 | 9/2008 | Elumalai et al. | |
| 2009/0044116 A1 | 2/2009 | Kitabayashi | |
| 2009/0153335 A1 | 6/2009 | Birtcher | |
| 2009/0171679 A1 | 7/2009 | Salgado et al. | |
| 2009/0248695 A1 | 10/2009 | Ozzie | |
| 2009/0327911 A1 | 12/2009 | Ningune et al. | |
| 2010/0199195 A1* | 8/2010 | Carounanidy | G06F 16/9577 715/760 |
| 2011/0072349 A1 | 3/2011 | Catanese et al. | |
| 2011/0161843 A1 | 6/2011 | Bennett et al. | |
| 2011/0283215 A1* | 11/2011 | Dunn | G06F 9/451 715/771 |
| 2012/0066699 A1 | 3/2012 | Kinkade et al. | |
| 2012/0117507 A1 | 5/2012 | Tseng et al. | |
| 2012/0144210 A1 | 6/2012 | Yacobi | |
| 2012/0158521 A1 | 6/2012 | McCullen | |
| 2012/0167016 A1 | 6/2012 | Rauh et al. | |
| 2012/0216125 A1 | 8/2012 | Pierce | |
| 2012/0253788 A1 | 10/2012 | Heck | |
| 2012/0254227 A1 | 10/2012 | Heck | |
| 2012/0260318 A1 | 10/2012 | Fromentoux et al. | |
| 2012/0265528 A1 | 10/2012 | Gruber | |
| 2013/0024760 A1 | 1/2013 | Vogel et al. | |
| 2013/0067365 A1 | 3/2013 | Shrufi et al. | |
| 2013/0086473 A1 | 4/2013 | Faust et al. | |

(56) References Cited

U.S. PATENT DOCUMENTS

| | | | |
|---|---|---|---|
| 2013/0152017 A1* | 6/2013 | Song | G06F 3/0482 |
| | | | 715/811 |
| 2013/0152072 A1 | 6/2013 | Fernandez-Ruiz et al. | |
| 2013/0174034 A1 | 7/2013 | Brown | |
| 2013/0204813 A1 | 8/2013 | Master | |
| 2013/0219333 A1 | 8/2013 | Palwe et al. | |
| 2014/0040748 A1 | 2/2014 | Lemay | |
| 2014/0068459 A1 | 3/2014 | Graham | |
| 2014/0068549 A1 | 3/2014 | Friedman et al. | |
| 2014/0068593 A1 | 3/2014 | McErlane et al. | |
| 2014/0074483 A1 | 3/2014 | Van Os | |
| 2014/0123072 A1 | 5/2014 | Bhowmick et al. | |
| 2014/0050455 A1 | 7/2014 | Ni et al. | |
| 2014/0215381 A1 | 7/2014 | Huang | |
| 2014/0244488 A1 | 8/2014 | Kim et al. | |
| 2014/0337770 A1 | 11/2014 | Sasaki | |
| 2014/0344024 A1 | 11/2014 | Kempf | |
| 2014/0351744 A1 | 11/2014 | Jeon et al. | |
| 2014/0379664 A1 | 12/2014 | Wiegenstein et al. | |
| 2015/0006135 A1 | 1/2015 | Deb et al. | |
| 2015/0026477 A1 | 1/2015 | Malatack et al. | |
| 2015/0040104 A1 | 2/2015 | Mall | |
| 2015/0074069 A1 | 3/2015 | Baeuerle et al. | |
| 2015/0089373 A1 | 3/2015 | Dwivedi et al. | |
| 2015/0089403 A1 | 3/2015 | Zhu et al. | |
| 2015/0123993 A1 | 5/2015 | Ohba | |
| 2015/0161180 A1 | 6/2015 | Hermanns et al. | |
| 2015/0178769 A1 | 6/2015 | Mirisola et al. | |
| 2015/0186156 A1 | 7/2015 | Brown | |
| 2015/0195406 A1 | 7/2015 | Dwyer | |
| 2015/0206169 A1 | 7/2015 | Ye et al. | |
| 2015/0278868 A1 | 10/2015 | O'Connor et al. | |
| 2015/0278876 A1 | 10/2015 | Xiong et al. | |
| 2015/0319143 A1 | 11/2015 | Kim et al. | |
| 2015/0339036 A1 | 11/2015 | Hwang | |
| 2015/0382047 A1 | 12/2015 | Van Os | |
| 2016/0062745 A1 | 3/2016 | Rao | |
| 2016/0070580 A1 | 3/2016 | Johnson | |
| 2016/0092883 A1 | 3/2016 | Weber et al. | |
| 2016/0094497 A1 | 3/2016 | Javed | |
| 2016/0337426 A1 | 11/2016 | Shribman et al. | |
| 2016/0378326 A1* | 12/2016 | Svinth | G06F 3/0488 |
| | | | 715/784 |
| 2017/0123397 A1 | 5/2017 | Billi et al. | |
| 2017/0177650 A1 | 6/2017 | Devine | |
| 2017/0302686 A1 | 10/2017 | Medvedovsky | |
| 2017/0329466 A1 | 11/2017 | Krenkler et al. | |
| 2017/0329468 A1 | 11/2017 | Schon et al. | |
| 2017/0329483 A1 | 11/2017 | Jann et al. | |
| 2017/0329499 A1 | 11/2017 | Rauschenbach et al. | |
| 2017/0329500 A1 | 11/2017 | Grammaikakis et al. | |
| 2017/0329505 A1 | 11/2017 | Richter et al. | |
| 2017/0329580 A1 | 11/2017 | Jann et al. | |
| 2017/0329581 A1 | 11/2017 | Jann et al. | |
| 2017/0329614 A1 | 11/2017 | Schon et al. | |
| 2017/0331915 A1 | 11/2017 | Jann et al. | |
| 2017/0344218 A1 | 11/2017 | Jann et al. | |
| 2017/0346949 A1 | 11/2017 | Sanghavi | |
| 2019/0004774 A1 | 1/2019 | Mount | |
| 2019/0057161 A1 | 2/2019 | Ackerman et al. | |

OTHER PUBLICATIONS

"SAP Blog Part 2", Ferriero, S. (May 9, 2016), How to create smart Templates annotations within CDS views—Part 2. [Retrieved Oct. 8, 2018] https://blogs.sap.com/2016/05/09/how-to-create-smart-templates-annotations-within-cds-views-part-2 (15 pages).

Final Office Action issued in U.S. Appl. No. 15/461,296 dated Apr. 2, 2019, 34 pages.

Non-Final Office Action issued in U.S. Appl. No. 15/461,236 dated Apr. 1, 2019, 28 pages.

Final Office Action issued in U.S. Appl. No. 15/462,084 dated Apr. 5, 2019, 21 pages.

"SAP Blog Part 3", Ferriero, S. (May 9, 2016), How to create smart Templates annotations within CDS views—Part 3. [Retrieved Mar. 27, 2018] https://blogs.sap.com/2016/05/09/how-to-create-smart-templates-annotations-within-cds-views-part-3 (22 pages).

EP Extended European Search Report for European Appln. No. 17000813.0, dated Aug. 23, 2017, 7 pages.

U.S. Non-Final Office Action in U.S. Appl. No. 15/390,262, dated Nov. 30, 2018, 18 pages.

U.S. Non-Final Office Action in U.S. Appl. No. 15/461,290, dated Jun. 22, 2018, 18 pages.

U.S. Non-Final Office Action in U.S. Appl. No. 15/461,296, dated Dec. 11, 2018, 26 pages.

U.S. Non-Final Office Action in U.S. Appl. No. 15/461,313, dated Apr. 5, 2018, 10 pages.

U.S. Non-Final Office Action in U.S. Appl. No. 15/461,330, dated Aug. 10, 2018, 14 pages.

U.S. Non-Final Office Action in U.S. Appl. No. 15/462,084, dated Nov. 21, 2018, 15 pages.

U.S. Non-Final Office Action in U.S. Appl. No. 15/591,989, dated Nov. 14, 2018, 15 pages.

Non-Final Office Action issued in U.S. Appl. No. 15/461,319, dated Jun. 20, 2019, 23 pages.

Non-Final Office Action issued in U.S. Appl. No. 15/591,995 dated May 3, 2019, 42 pages.

Final office action issued in U.S. Appl. No. 15/461,236 dated Sep. 24, 2019, 41 pages.

Final office action issued in U.S. Appl. No. 15/591,999 dated Sep. 30, 2019, 37 pages.

* cited by examiner

Navigation target selection dialog in tile settings mode

| Tile Type | Brief Description | Example | | |
|---|---|---|---|---|
| KPI | Measure/Monitor Key operating metrics | US Profit Margin<br>By Region<br><br>-99.99 Mio EUR | | |
| Comparison Chart | Visual comparison between different values | Comparative Annual Totals<br>Subtitle<br><br>Americas 134M<br>APAC 97M<br>EMEA 234M<br>APA 197.123M<br>Optional Footer | | |
| Bullet Chart | Comparing a single value to one or more target values | Cumulative Totals<br>Expenses<br>25.5 Mio<br>75 Mio EUR | Cumulative Totals<br>Expenses<br>25.5 Mio<br>75 Mio EUR | Cumulative Totals<br>Expenses<br>25.5 Mio<br>75 Mio EUR |
| Trend Chart | Accumulated totals over time | Incoming Customer Complaints<br>By Region<br>0 Mio 80 Mio<br>June 1 June 30 EUR | Comparative Annual Totals<br>Subtitle<br>120.34 Mio 800 Mio<br>Feb 1 Dec 30 EUR | |
| Tile Type | Brief Description | Example | | |
| Bar chart | Visual comparison between different values | Receivables Aging<br>Overdue and due<br>Days | Receivables Aging<br>Overdue and due<br>Days | Receivables Aging<br>Overdue and due<br>Days |
| Launch | Identifying a resource (by title and an icon) that may be launched | My Travel Expenses<br>By Quarter | Financial Statement<br><br>Optional Footer | |
| Monitoring | Current status of an object | Approve Travel Request<br><br>35<br>Leave Requests | | |

FIG. 8

| Card Type | Example | | |
|---|---|---|---|
| Quick View | Contact Card<br><br>Dagmar Schulze<br>Sr. Director of Marketing<br><br>Contact Info<br>Mobile:<br>+001 6101 34869-0<br>Email:<br>dagmar.schulze@beckerberlin.de<br>Address:<br>Main Street 4572, Los<br>Angeles USA<br><br>Share | | |
| Analytic | Open Purchase Orders<br>88.8 MM  +18% YTD<br><br>(donut chart)<br>24-Seven A&A Alexei's Specialties<br>Choices Franchise 1 A&AB<br>Share | Open Purchase Orders<br>9999 MM  +18% YTD<br><br>(bubble chart)<br>2011 2012 2013 2014 2015<br>Dimension1 Dimension2<br>Nagcy main action | Open Purchase Orders<br>88.8 MM  +18% YTD<br><br>(line chart)<br>2011 2012 2013 2014 2014<br>Dimension1 Dimension2<br>Nagcy main action |
| Image | Overdue Pos(8)<br>Supplier performing below target score of 78 for operation room. Period ending Dec, 14<br>Latin American Region<br><br>(image)<br><br>Share | | |
| List | Inventory Turnover<br>Inventory turnover is 2%, valued at $22M.<br><br>Oplex ACC USB 4" Cable<br>1345894<br><br>Oplex AIR Laptop<br>1239102<br><br>Oplex Mini Desktop<br>1739554<br><br>Oplex Servers<br>2348842<br><br>Oplex Web 2.0 Server<br>82396791<br><br>Showing 5 out of 10 | | |

OBJECT PAGES IN MULTI APPLICATION USER INTERFACE

CROSS-REFERENCE TO RELATED APPLICATIONS

This application claims priority to and the benefit of U.S. Provisional Application No. 62/335,888, filed May 13, 2016, U.S. Provisional Application No. 62/335,892, filed May 13, 2016, U.S. Provisional Application No. 62/335,895, filed May 13, 2016, U.S. Provisional Application No. 62/335,897, filed May 13, 2016, U.S. Provisional Application No. 62/335,899, filed May 13, 2016, U.S. Provisional Application No. 62/335,873, filed May 13, 2016, U.S. Provisional Application No. 62/335,875, filed May 13, 2016, U.S. Provisional Application No. 62/335,879, filed May 13, 2016, U.S. Provisional Application No. 62/335,883, filed May 13, 2016, U.S. Provisional Application No. 62/335,886, filed May 13, 2016, and U.S. Provisional Application No. 62/335,887, filed May 13, 2016, each of which provisional application is incorporated by reference in its entirety.

TECHNICAL FIELD

This description generally relates to user interfaces and user experiences. The description, in particular, relates to systems and techniques for providing a user experience for viewing data and information related to multiple software applications on a computing device.

BACKGROUND

Users may utilize or interact with multiple software applications at the same time. The multiple applications may be hosted on the same or different types of computer platforms or systems and accessed from the users' client devices. In example implementations, the different types of computer platforms or systems may include, for example, SAP HANA, SAP ABAP, or other enterprise-type computer platforms or systems.

The multiple applications may, for example, include transactional applications (e.g., applications with task-based access) for accessing tasks like "change", "create" or "approve" processes with guided navigation; analytical applications, which may provide insights (e.g., a visual overview of a personalized topic for further KPI related analyses); and factsheet applications, which may provide essential information about objects and contextual navigation between related objects; and, drill down applications and reports.

In example implementations, the suite of the multiple applications which an enterprise may deploy (and which users may need to use for their work) may be large. A sample of the large number of applications that may be deployed by an enterprise for its operations may, for example, include applications in the areas or domains of Finance, R&D, Engineering, Human Resources, Manufacturing, etc. Different subsets of these applications may be used in the work of enterprise personnel, who, for example, may have a variety of different roles. Each user may have a need to use a different respective subset of the multiple applications, based, for example, on the user's role in the enterprise.

Consideration is now given to user experience in utilizing or interacting with multiple applications and facilitating a user's use of a different respective subset of the multiple applications.

SUMMARY

A system for presenting a common user interface (UI) of multiple applications on diverse client computing devices as a web page that includes a set of UI elements leading to the multiple applications. The diverse client computing devices have display screens of diverse sizes. In the system, backend servers host a UI infrastructure including the common UI and one or more object page floorplans of respective UI object pages representing the multiple applications and representing application information and data on the diverse client computing devices. Design tools are available to process the object page floorplans to display, create, or edit the UI object pages. The object page floorplans include a first object page layout including a title bar, a header, an expanded default state, a navigation control, a content area, and a footer toolbar containing actions that are performed upon a corresponding first UI object page.

In a general aspect, a method includes presenting a common user interface (UI) of multiple applications on diverse client computing devices as a web page that includes a set of UI elements leading to the multiple applications. The diverse client computing devices have display screens of diverse sizes. The method includes retrieving one or more object page floorplans of respective UI object pages representing the multiple applications and representing application information and data on the diverse client computing devices. The method further includes processing the object page floorplans to display, create, or edit the UI object pages representing the multiple applications and representing application information and data on the client computing device. The object page floorplans include a first object page layout including a title bar, a header, an expanded default state, a navigation control, a content area, and a footer toolbar containing actions that are performed upon a corresponding first UI object page.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

The accompanying drawings, in which like numerals indicate like components, illustrate embodiments of the disclosed subject matter.

FIG. 1 is a screen shot of an example personalized user interface (UI) display, in accordance with the principles of the present disclosure.

FIG. 8 is an illustration of example tile types that may be available (e.g., in a tile catalog) inclusion on the common UI, in accordance with the principles of the present disclosure.

FIG. 14B is an illustration of a concept of a snapping header design of an object page compared to a non-snapping header design of another object page, in accordance with the principles of the present disclosure.

DETAILED DESCRIPTION

Figure 2:
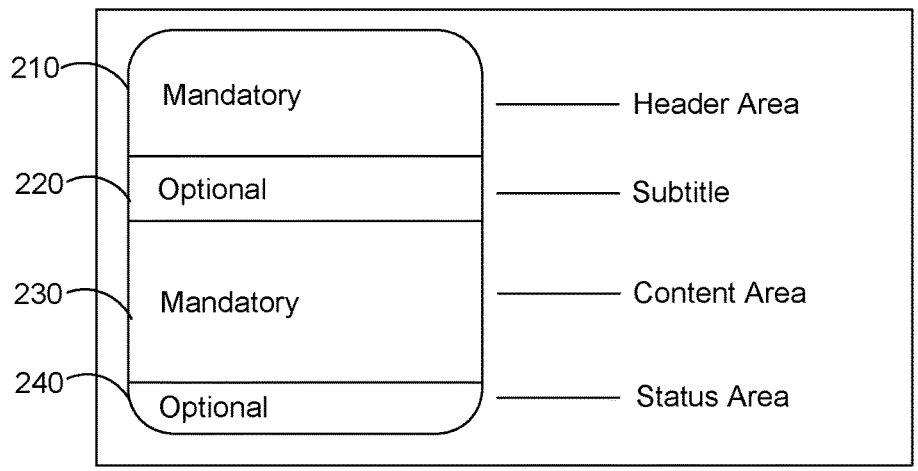
FIG. 2 is an illustration of an example tile/container structure, in accordance with the principles of the present disclosure.

A client computer device-user interface (UI) structure or framework provides a common UI for access to, or interaction with, a suite of multiple and diverse applications (or data sources), in accordance with the principles of the present disclosure. The multiple applications may be hosted on the same or different types of computer platforms or systems (possibly including some applications hosted on the client device itself). In example implementations, the different types of computer platforms or systems may include, for example, SAP HANA, SAP ABAP, or other enterprise-type computer platforms or systems.

The multiple applications may, for example, include transactional applications (e.g., applications with task-based access) for accessing tasks like "change", "create' or "approve" processes with guided navigation; analytical applications, which may provide insights (e.g., a visual overview of a dedicated topic for further KPI related analyses); and factsheet applications, which may provide essential information about objects and contextual navigation between related objects; and, drill down applications and reports.

In example implementations, the suite of the multiple applications which an enterprise may deploy for its operations (e.g., in the areas or domains of Finance, R&D, Engineering, Human Resources, Manufacturing, etc.) may be large. Different subsets of these applications may be used in the work of enterprise personnel who may have a variety of different roles. Each user may have a need to use a different respective subset of the multiple applications, based, for example, on the user's role in the enterprise.

The common UI for the multiple and diverse applications may, for example, provide services to a user for application-to-application navigation, personalization, search, and incident creation. The common UI may be designed to provide a common, same or unified user experience (UX) to the user when launching, accessing or interacting with one or more of the multiple applications. In an example implementation, a backend or gateway computer system (which may be connected to the multiple applications or hosts) may generate the common UI. The common UI may be delivered or presented as a web page on the client computer device and serve as a single web-based entry point for multiple applications and analytics across platforms and devices.

Each of the multiple applications may be represented by, or delivered via, content (e.g., a graphical user element (GUI), link, tile, factsheet, or other object) on the common UI. Further, the content of the common UI may be customized or personalized to a user (e.g., based on user role, authorization level, user interests or needs, etc.) for access to, or interaction with, a selected subset of the multiple applications (or data sources). Each of the selected subset of multiple applications may be represented a specific object (e.g., a tile or link) on the common UI. The specific object (e.g., tile or link) may be identified or labelled by a name, title, or icon indicating the specific application which the specific object represents. The tile or link (e.g., by a single click) may be used as an application launcher on the common UI to launch the application that the tile or link represents.

The tiles corresponding to the specific applications represented on the common UI may be organized as a group or array of tiles in a "tiles area" of the UI. Similarly, links corresponding to specific applications represented on the common UI may be organized as a list of links in a "links area" on the common UI. A Design Time Tool (e.g., available, for example, in a menu or via a tile or link on the common UI) may allow users or administrators to define which applications should be displayed as links or tiles on the common UI. Users/Administrators may personalize the tiles area and the link list area to a user.

The common UI, which is customized or personalized for a user, may be, referred to as the "personalized UI", "personalized common UI", "Launchpad," "home page," or "home screen" herein. The Launchpad or home page may be the first page that a user sees after he or she has logged in. The Launchpad or home page may be a shell that hosts UI applications, and provides the UI apps with services such as navigation, personalization, embedded support, and application configuration.

The content of the personalized UI may be organized in one or more containers (e.g., main or center "shell" container, left container, right container) for display on a display screen of a client computer device. The main container may contain the Launchpad or home page, which may act as the starting or focal location for initiating application-to-application navigation, personalization, search, and incident creation.

Which ones of the one or more containers are displayed on the display screen at given moment may depend, for example, the status of tasks or activities of the user navigating the UI, and also, for example, on the size of the display screen of the client computer device available for display.

One or more containers of the personalized UI may have adjustable amounts of displayed content (e.g., number of tiles) (and correspondingly adjustable display size or display area) so that the same personalized UI can be adapted for display on different-sized display screens of different client device types (e.g., smartphone, smart watches, laptops, work station, tablet, desktop computer, etc.), and across all possible deployment options (e.g., on premise, cloud, as-a-service, etc.).

In example implementations, a container (e.g., center container, Launchpad) may be used to display main or core content for a user (e.g., application/tiles relevant to a user's work or role). Launchpad serves as the shell container to access all content. Other containers may include different panels with different floorplans for different content corresponding user interests or activities (e.g. a "ME" panel displaying information or personal data about a user, a "notifications center" displaying notifications (e.g., e-mail, text messages, alerts, etc.) for the user, a panel displaying discussion threads or boards, an Overview Page, an Object Page (e.g., a floorplan to view, edit and create objects), a panel displaying context and ad-hoc workflows, a panel displaying dynamic sidebar information, a dynamic side content panel, etc. The dynamic side content is a layout control that allows additional content such as timeline, chat, additional information to be displayed in a way that flexibly adapts to different screen sizes.

Figure 1:
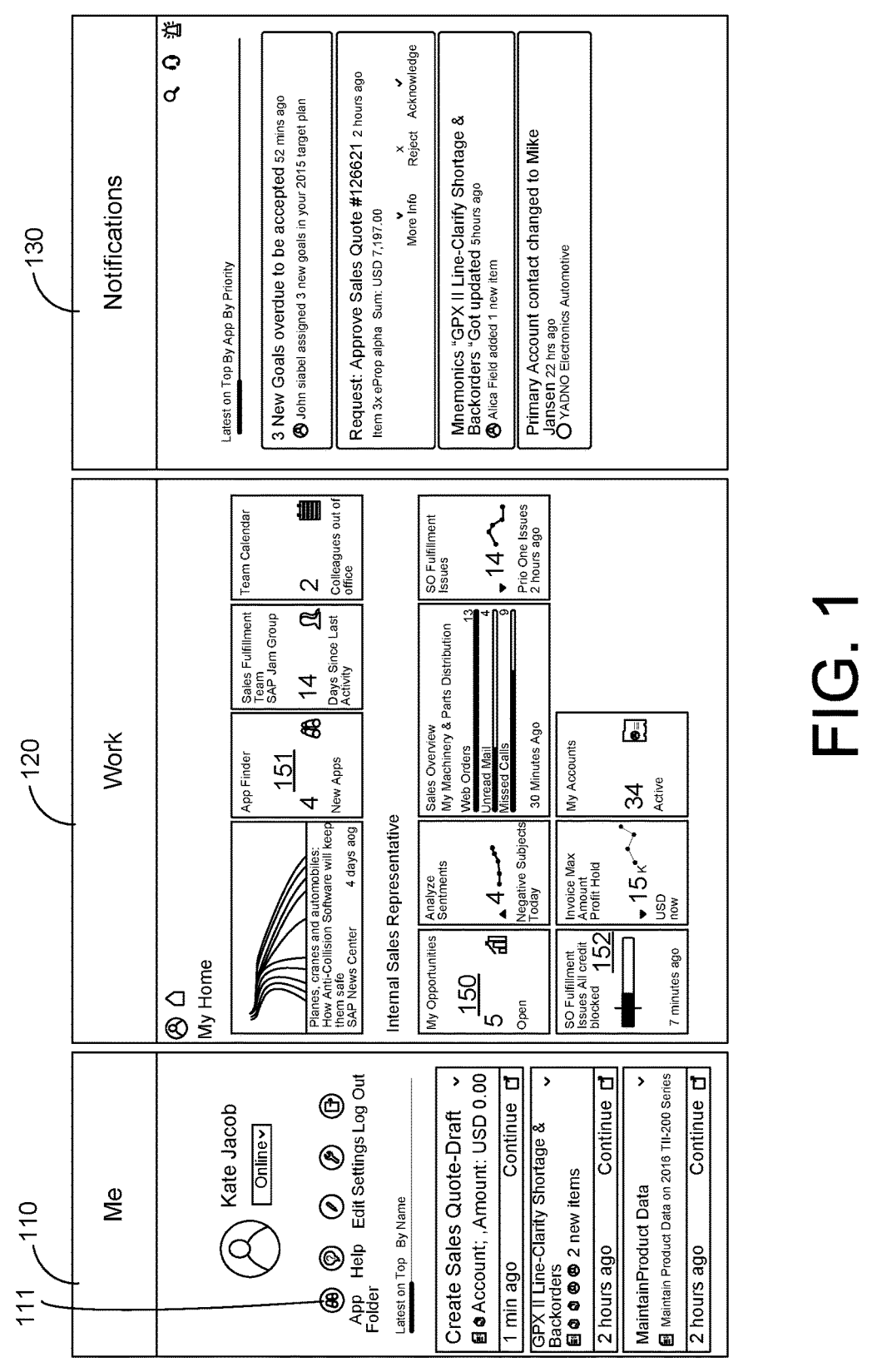

FIG. 1 shows an example display of a personalized common UI 100, in accordance with the principles of the present disclosure. Common UI 100 may include a center container 120 (e.g., "Work") with content relevant to the user's work, domain, or role in the enterprise, a left side container 110 (e.g., "ME") with content personal to the user; and a right side container 130 (e.g., "Notifications") with notifications directed to the user. These containers may be referred to herein as "Viewports."

In accordance with the principles of the present disclosure, personalized common UI 100 may be presented as a uniquely integrated, multifaceted user interface which may in effect transform a single-screen view on the client computer device into three multifunctional screen areas (e.g., Left/Center/Right "Viewports"). As shown in FIG. 1, located in the center is the "Work" Viewport 120 which may, for example, display either the Launchpad (Home Screen) or an active application screen that was previously selected or opened from the Launchpad tile array. The left "Me" Viewport 110 may, for example, provide various generalized functionalities related to the user and their operation and personalization. The right "Notifications" Viewport 130 may, for example, display one or more of a broad array of notification types (System Alerts, messages, reminders, tasks alerts, etc.) in a customizable listing format. The Launchpad or home screen Viewport, which may available at all times and in any application, may provide a clear screen orientation for accessing corresponding application information as well as generalized functionalities and navigations without ever disrupting a user's context of their current task at hand. On a client computer device (e.g., a mobile device), which has a limited display screen area, personalized UI display 100 may be adapted to present a fewer of the 3 multifunctional screen areas or Viewports on the device's limited display screen area. For example, only the Center, Left/Center or Center/Right screen areas or Viewports may be presented on a mobile device's display screen.

For convenience in description, the terms "Work Viewport", "center Viewport", "Launchpad", "home screen" and "home page" may be used interchangeably herein.

In example implementations, the applications (which, for example, may be a set of applications implemented on HTML5/CSS/JS technology using a SAPUI5 framework) delivered via common UI 100 may adhere to a consistent, responsive design that allows users to seamlessly experience the applications across interaction channels—desktop, tablet, mobile, etc. Further, the applications delivered via the common UI may include legacy applications implemented on traditional platforms using legacy UI technologies (e.g., FPM/WDA, SAPGUI for HTML, SAPGUI for Windows, etc.). Access to legacy applications may, for example, be provided via corresponding links in a links area of common UI 100.

Tiles

In an example implementation of common UI 100, a start screen (e.g., main container, "Launchpad" or home page) may present assigned applications as so-called "tiles" (e.g., tile 150, tile 151, tile 152, etc.). Tiles (which are user-activable UI elements) may only be used as application launchers for launching applications and presenting the applications on the Launchpad. An App Descriptor defines Navigation Intent (=Semantic Object+Action) to launch the transaction; Title, Subtitle and Icon for the Application Launcher, i.e. the text of the tile; and Parameters, e.g. order number.

A user may use these tiles (e.g., tile 150, tile 151, tile 152, etc.) to launch or navigate to specific applications. Incorporated into the Launchpad may be a Launchpad Designer tool, which allows assignment of tiles to users and user groups for customization or personalization (e.g., based on user role) of common UI 100. As a general rule, each of the multiple applications (for which common UI 100 serves as an interface) may correspond to at least one tile. An exception to the general rule may be for factsheet applications, which need not be represented by tiles. However, factsheets may optionally still be saved as and represented by tiles on common UI 100 if desired.

Users may (e.g., using the Launchpad Designer tool) personalize their home page on common UI 100 (e.g., Launchpad) by selecting the tiles/applications to be shown on the home page from a tile catalog (which may be maintained, for example, by the backend computer system generating common UI 100). The tiles available to a user in the tile catalog may depend on the user's role. The tile catalog may show all the available tiles, which may be organized into catalog groups. Pre-defined catalog groups may be assigned to different user-roles. A group selection and a search field help may assist users to find and select the right tile or tiles for their needs. The home page can be personalized and tiles can be added, removed, individually or bundled in groups.

A user may add frequently used or accessed tiles to their home page on common UI 100. However, seldom used tiles may be accessed directly from the tile catalog, without adding them to the home page. The tiles added to the home page may be part of a group or groups of tiles (i.e. a predefined set of tiles) the user sees on his or her home page on common UI 100. The number of visible tiles on the Launchpad home page may depend on the display screen resolution of the client computer device on which common UI 100 is displayed. If the tiles in a group do not fit in one row on the display screen, they may be wrapped to the next row. Further, the size of the displayed tiles may be responsive to the size of the display screen. For example, smaller sized tiles may be displayed on a smart phone display screen that on a desktop computer screen.

A traditional tile, apart from serving as an UI element or button for launching an application, includes only an application identifier (e.g., name, title or representative icon or logo) of the application that the tile represents. In some instances, a tile as serving an UI element or button for launching an application may be shown as an icon (e.g., icon 111)

In accordance with the principles of the present disclosure, a tile that represents an application (on common UI 100 or any other UI), apart from serving as an UI element or button for launching the application and displaying the application identifier, may be a container that displays different types of additional information or content. The additional information may include, for example, informative text, numbers, and charts. The displayed tile content may be static or dynamic. The displayed tile content may be dynamically updated and may include, for example, data (e.g., trends or key performance indicators (KPIs), and application status, etc.) supplied by the backend systems or applications to which the tile is represents.

In example implementations, the tile/container may include both mandatory and optional display blocks and areas. FIG. 2 shows an example tile/container structure 200, in accordance with the principles of the present disclosure. For displaying various content Tile/container structure 200 may include different display blocks or areas (e.g. a Header Area 210, a Subtitle Area 220, a Content Area 230 and a Status Area 240). The Header Area and the Content Area may be mandatory display blocks or areas, while the Subtitle Area and the Status Area may be optional display blocks or areas. The mandatory header area (and the optional subtitle area) may display information identifying the application which the tile represents.

In example implementations, mandatory Content Area 230 of tile/container structure 200 may be used to display content defined or generated by the applications. This content may, for example, include any of KPIs, charts, texts, numbers or icons (or any combinations thereof). Optional Status Area 240 may be a text-only area for status messages, which may, for example, relate to the status of the underlying application or the displayed tile content. Example status messages may include "Current Quarter", "Being refreshed", "Unable to load," "New notification," etc.

In a variation of tile/container structure 200, which may be used for feed tiles (e.g., for an RSS data feed tile), the Header Area may be optional with only the Content Area being the only mandatory display blocks or area.

The content displayed by all the tiles on the home page may be refreshed by pulling in refreshed content at login or when the web browser or web page on the client computer device is refreshed.

Figure 3:
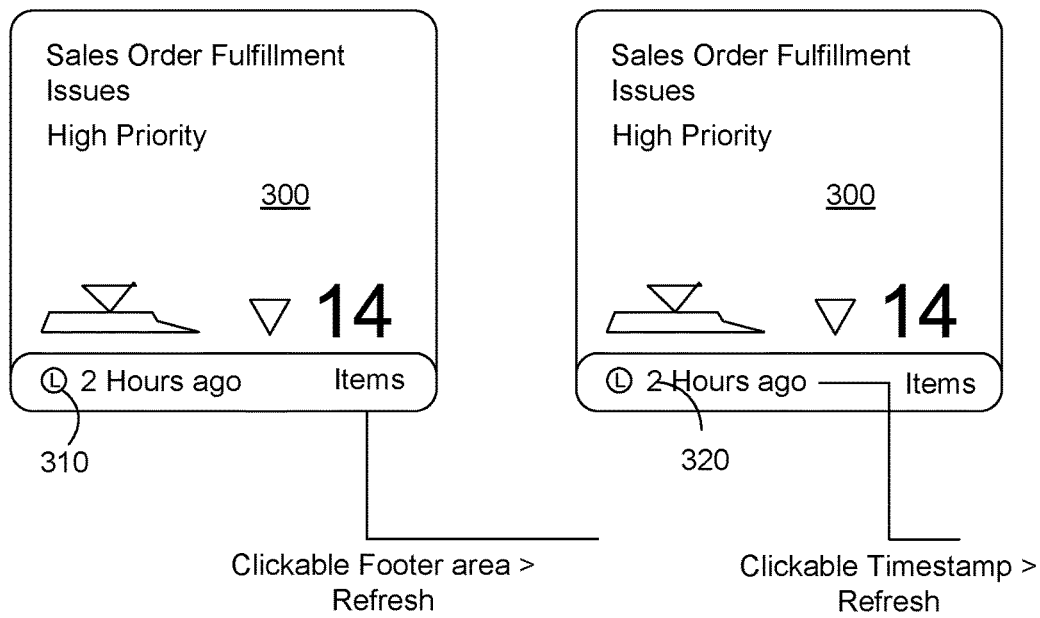
FIG. 3 is an illustration of another an example tile/container structure, in accordance with the principles of the present disclosure.

In another example implementation, the tile/container structure may include additional or alternate UI elements. For example, FIG. 3 shows an example tile/container structure 300 with additional or alternate UI elements, in accordance with the principles of the present disclosure. Tile/container structure 300 may include a user-activable button 310 (e.g., in a clickable footer region), which can be activated by a user on a displayed tile to refresh the content displayed by the individual tile. In yet another example implementation, tile/container structure 300 may include a clickable footer/timestamp region 320, which may be used to display a time stamp (e.g. 2 hours ago, 5 hours ago, current, etc.) for the content displayed by the tile. The clickable footer region may include a user-activable "refresh" button, which the user can click to initiate pulling refreshed content displayed by the individual tile. In one version, clicking anywhere in the footer region may initiate refresh. In another version, clicking on the timestamp itself may initiate refresh.

In some implementations, the time stamp and clickable "refresh" button may be provided for a group of tiles on common UI 100. The user can click the group level "refresh" button to initiate pulling refreshed content for all tiles in the group.

For an example implementation of common UI 100, a push model may be deployed for refreshing the content of all tiles displayed on common UI 100. The backend systems/ applications supporting common UI 100 may continually push content delta to the tiles on common UI 100 for display. In a version of the push model implementation, a user may access a tile setting mode (e.g., using the Launchpad Designer tool or a tile catalog personalization tool) to preset times intervals when the tile content should or should not be pushed to an individual tile.

Figure 4:
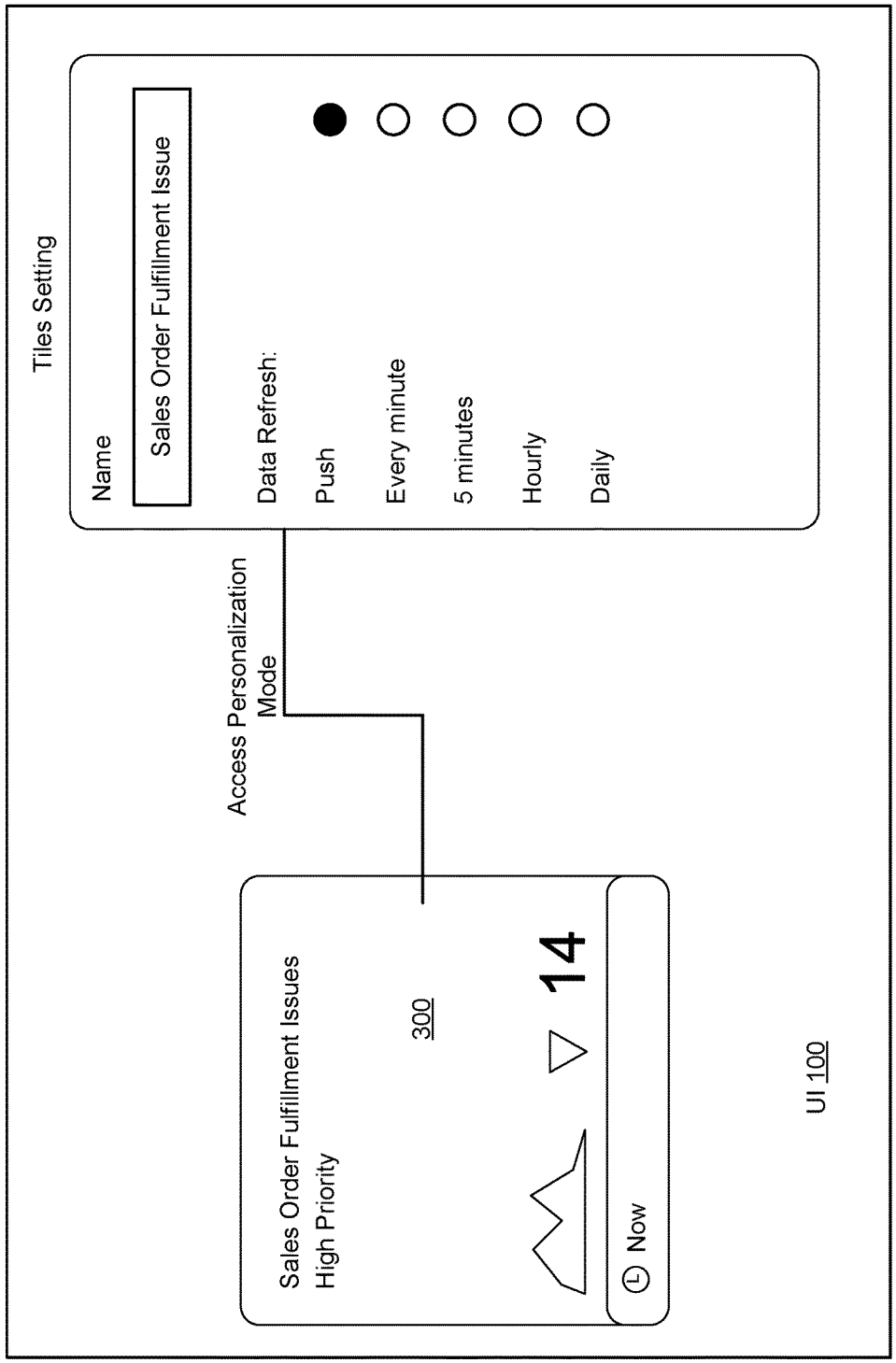
FIG. 4 is an illustration of an example tile setting mode dialog, in accordance with the principles of the present disclosure.

FIG. 4 shows an example tile setting mode dialog 400, in accordance with the principles of the present disclosure. Tile setting mode dialog 400 may be presented, for example, by a tile settings tool. In tile setting mode dialog 400, a user can select times (e.g., 1 minute, 5 minutes, hourly, daily) when refreshed content should be pushed to the individual tile displayed on common UI 100.

An application which is hosted in the Launchpad in common UI 100 can be started or launched in one of two ways. If the application is associated directly with a tile on the Launchpad, a user can launch the application by clicking on the respective tile. A second option is by cross application navigation. In such a case, a user may be working in a first application and this application may provide a navigational link to a second application, or to a navigation intent (i.e. a so-called semantic object and semantic action). Rather than linking a specific instance of the second application, the navigation intent (semantic object and semantic action) may be linked.

When a user clicks on a tile on common UI 100 to navigate to an application, the application ("navigation target") represented by the tile is opened. However, in some implementations, a tile included in common UI 100 may represent multiple applications (i.e. have multiple navigation targets). For example, a generic "Application Launcher" tile may be able to launch one or more applications. A generic "Track Supplier Invoices" tile may be capable of tracking supplier invoices for more than one supplier types, categories or contexts (e.g., foreign or domestic supply). For such tile instances, common UI 100 may be configured to show a target selection dialog by which the user can pre select which of the multiple targets is the intended navigation target. User selection of a navigation target may open the corresponding application.

Figure 5:
FIG. 5 is an illustration of an example target selection dialog through which a user can select, assign or change a navigation target for a tile, in accordance with the principles of the present disclosure.

FIG. 5 shows an example target selection dialog 500 in a tile setting mode on UI 100, in accordance with the principles of the present disclosure. Target selection dialog 500 may be presented, for example, by a tile settings tool. Additionally, the function for the target mapping may be available in a tile settings dialog presented, for example, by the Launchpad Designer or the Tiles Catalog when the user clicks on a tile.

Figure 6:
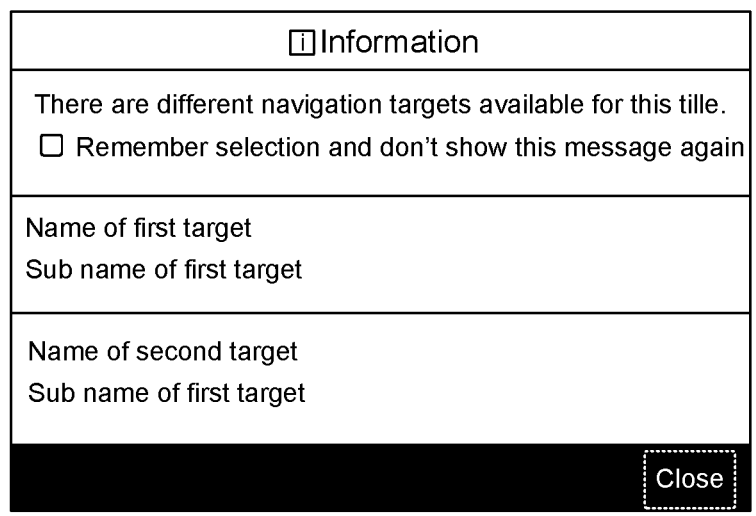
FIG. 6 is an illustration of another example tile settings dialog through which a user can select, assign or change a navigation target for a tile, in accordance with the principles of the present disclosure.

FIG. 6 shows another example tile settings dialog 600 through which a user can select, assign or change a navigation target for a tile, in accordance with the principles of the present disclosure. Tile settings dialog 600 may, like dialog 400 and dialog 500, be presented by a tile settings tool.

A user (or administrator) may personalize common UI 100, for example, by selecting which tiles (e.g., tile 150) are shown on common UI 100. The user (or administrator) may select tiles, for example, from the Tiles Catalog, for inclusion on common UI 100.

Figure 7:
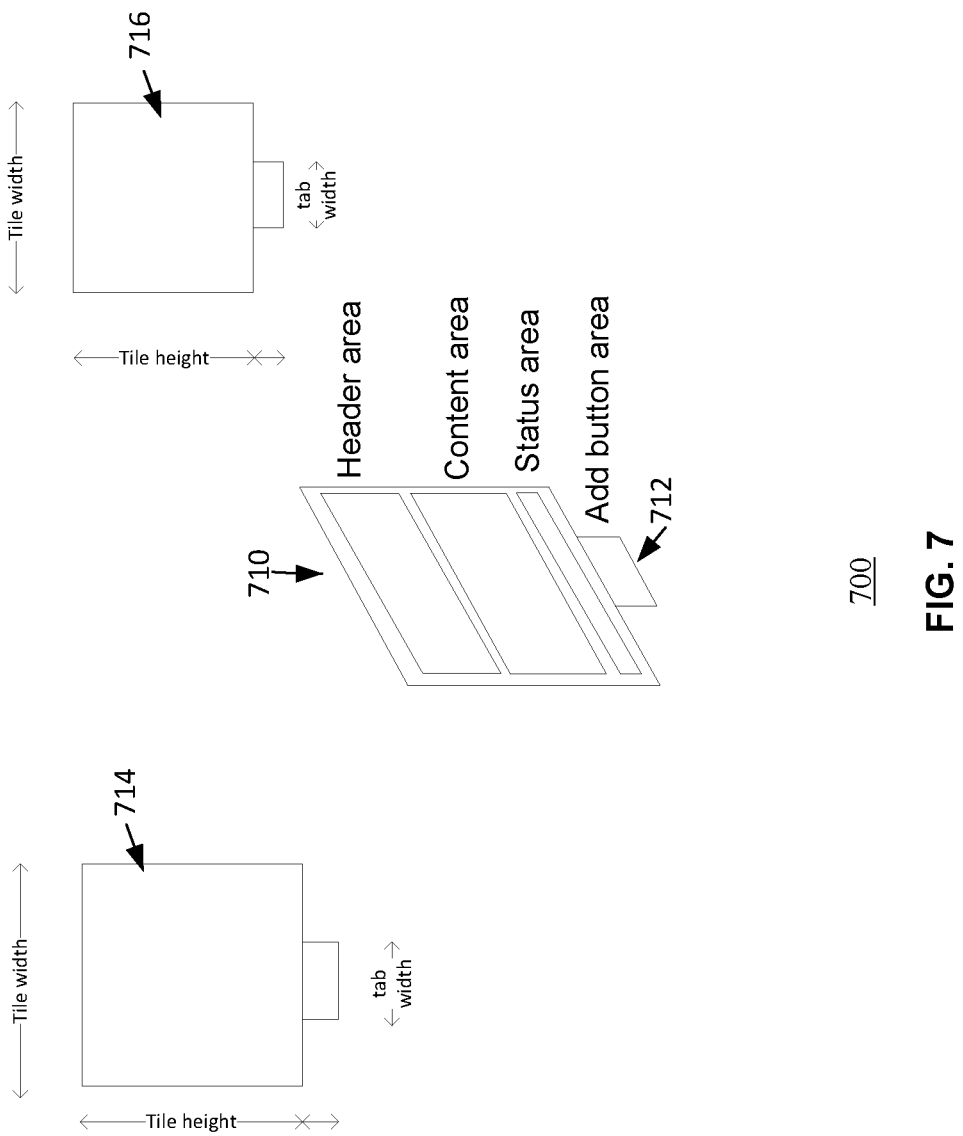
FIG. 7 shows an example page of the Tiles Catalog, which visually depicts a tile for selection (e.g., for inclusion in the personalized tile groups or tile arrays on the home page of common UI), in accordance with the principles of the present disclosure.

FIG. 7 shows an example page 700 of the Tiles Catalog, which visually depicts a tile 710 for selection (e.g., for inclusion in the personalized tile groups or tile arrays on the home page of common UI 100), in accordance with the principles of the present disclosure. Page 700 of the Tiles Catalog may provide a user-activable UI element (e.g., button 712 at the bottom of the visual depiction of tile 710) which may be used to select or add tile 710 to the personalized tile array on the home page of common UI 100. As described previously, the size of a displayed tile may depend on the size of the display screen of the client device on which common UI 100 is displayed. Page 700 may also include design drawings (e.g., drawings 714 and 716) showing of the dimensions of different-sized versions of tile 710 for use, for example, on different size display screens (e.g., of a desktop and a mobile device, respectively).

The tiles representing applications made available for inclusion on common UI 100 may be of different types (i.e. display different types of content). The different tile types may, for example, include "KPI", "Comparison Chart", "Bullet Chart", "Trend Chart", "Bar Chart", "Launch", and "Monitoring" tile types. FIG. 8 shows examples of tile types that may be available (e.g., in the tile catalog) for inclusion on common UI 100, in accordance with the principles of the present disclosure.

Similarly, the links (e.g. URL links) made available for inclusion in common UI 100 may have different types or display formats: Standard Link test titles, Link with subtitles, Links with counters, etc.

Figure 9A:
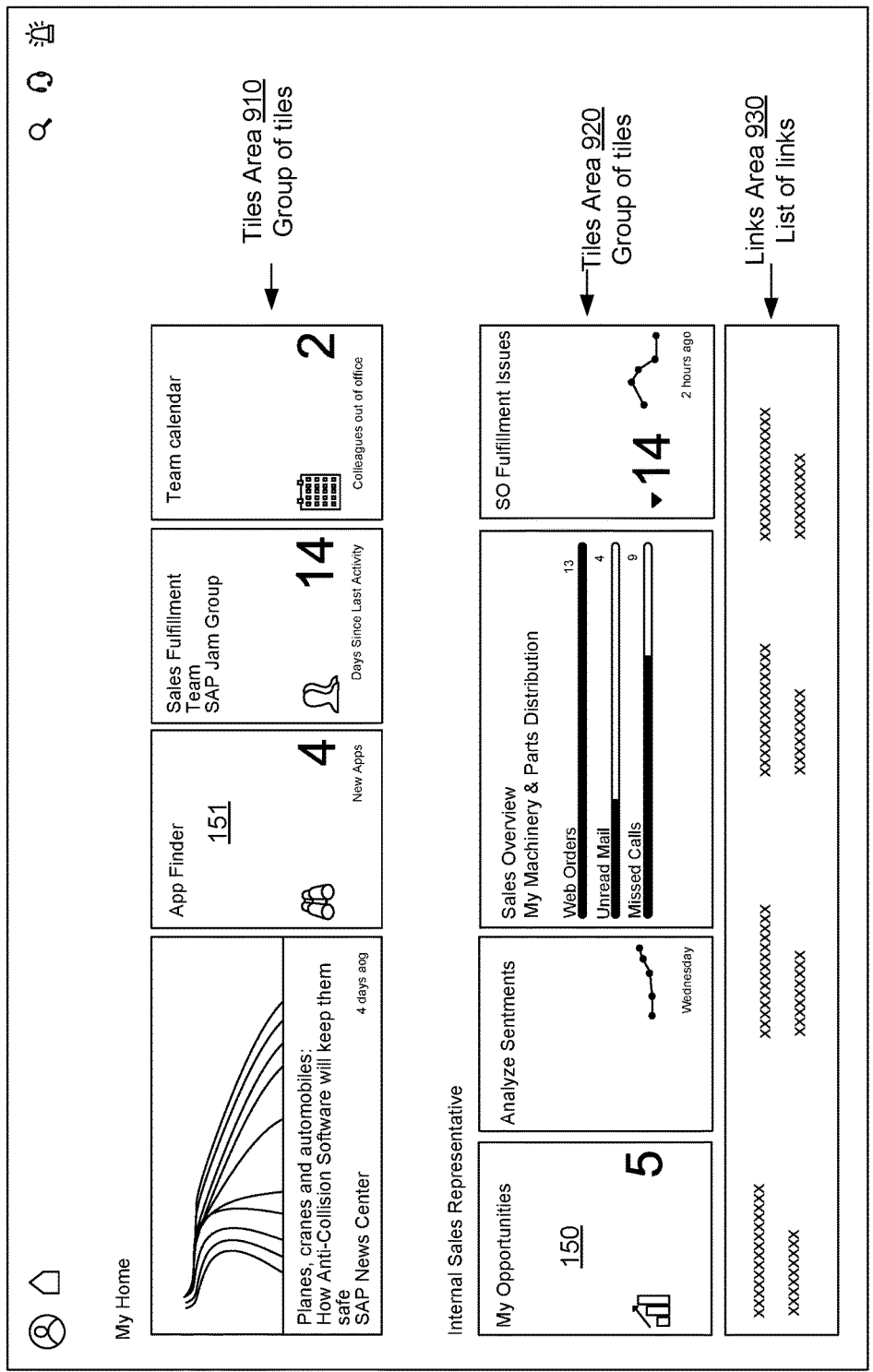
FIG. 9A is an illustration of an example user home page, which includes customized groups of array of tiles and a list of links, which represent different applications that the user may have a need or want to navigate to or use, in accordance with the principles of the present disclosure.

FIG. 9A shows an example user home page (e.g., Launchpad) 900, which includes a customized groups of array of tiles (e.g., in tiles area 910 and in tiles area 920) and a list of links (e.g., in links area 930), which represent different applications that the user may have a need or want to navigate to or use, in accordance with the principles of the present disclosure. Home page 900, in addition to the tiles that allow users to launch applications, may show additional information (e.g., menus or links to design or editing tools).

The tiles (which may have been selected from the Tiles Catalog) displayed on the home page may be arranged, for example, in rows in a tiles area (e.g., in tiles area 910 and in tiles area 920) of the home page. The tiles may display dynamic content supplied by the underlying applications. The arrangement of tiles and the list of links on the home page may, at a glance, provide the user an overview of resources (e.g., applications) available for work and the status of work-in-progress.

Applications which do not offer dynamic content on tiles (e.g., legacy applications or transactional applications) may be represented as links in the links list area on the home page. In customizing or personalizing the display of resources (e.g., applications) on the home page, the user may be able to drag and drop a tile from the tile area into the link list area to have the underlying application represented as a link on the home page. Conversely, a user may drag and drop a link from the links area into the tile area to have the linked application represented by a tile in the tile area of the home page.

In general, the Launchpad or home page may have a normal mode and an edit mode. In the edit mode, the home page may be personalized and tiles (and links) may be added, removed, or bundled in groups (using, for example, a Launchpad Design tool).

The tiles included on the home page may take any number of forms including, for example simple, complex, etc. A user/administrator may optionally edit, customize, etc. aspects of a tile (using, for example, a tile settings tool). Further, the user/administrator may optionally create, alter, remove, reposition, etc. groupings of one or more tiles. The tiles on the home page may be organized in groups based on any of a number of organizational paradigms (e.g., nested, stacked, and hierarchical, etc.) The placement, location, sizing, arrangement, etc. of tiles on the home page may be responsive, flexible, extensible, and dynamically configurable.

In example implementations, a tile may among other things dynamically adjust or adapt aspects of itself (e.g., size or contents) to account for any particulars (e.g., display real estate, input mechanism(s), etc.) of the client computer device on which the tile is hosted device.

Application Finder

Common UI 100 may offer one or more locator or finder mechanisms to the user to find resources or applications that may be available on the system.

In an example implementation, common UI 100 may include an "app finder" application that a user can utilize to locate or find other applications (e.g., in an application store) that may be available to the user. The app finder application itself may be represented by a tile on common UI 100. With reference to FIGS. 1 and 9A, an example app finder application may be represented, for example, by tile 151 in Work Viewport 120 and home page 900, and by icon 111 in Me Viewport 110 of common UI 100. By activating tile 151, for example, in home page 900 (or icon 111 in Me Viewport 110, FIG. 1), the user may launch the app finder application. The user may also be able to access the app finder application directly via an edit mode of home page 900 or Me Viewport 110. The user may launch or access the app finder application, for example, to add new applications (tiles) to the home page.

Figure 9B:
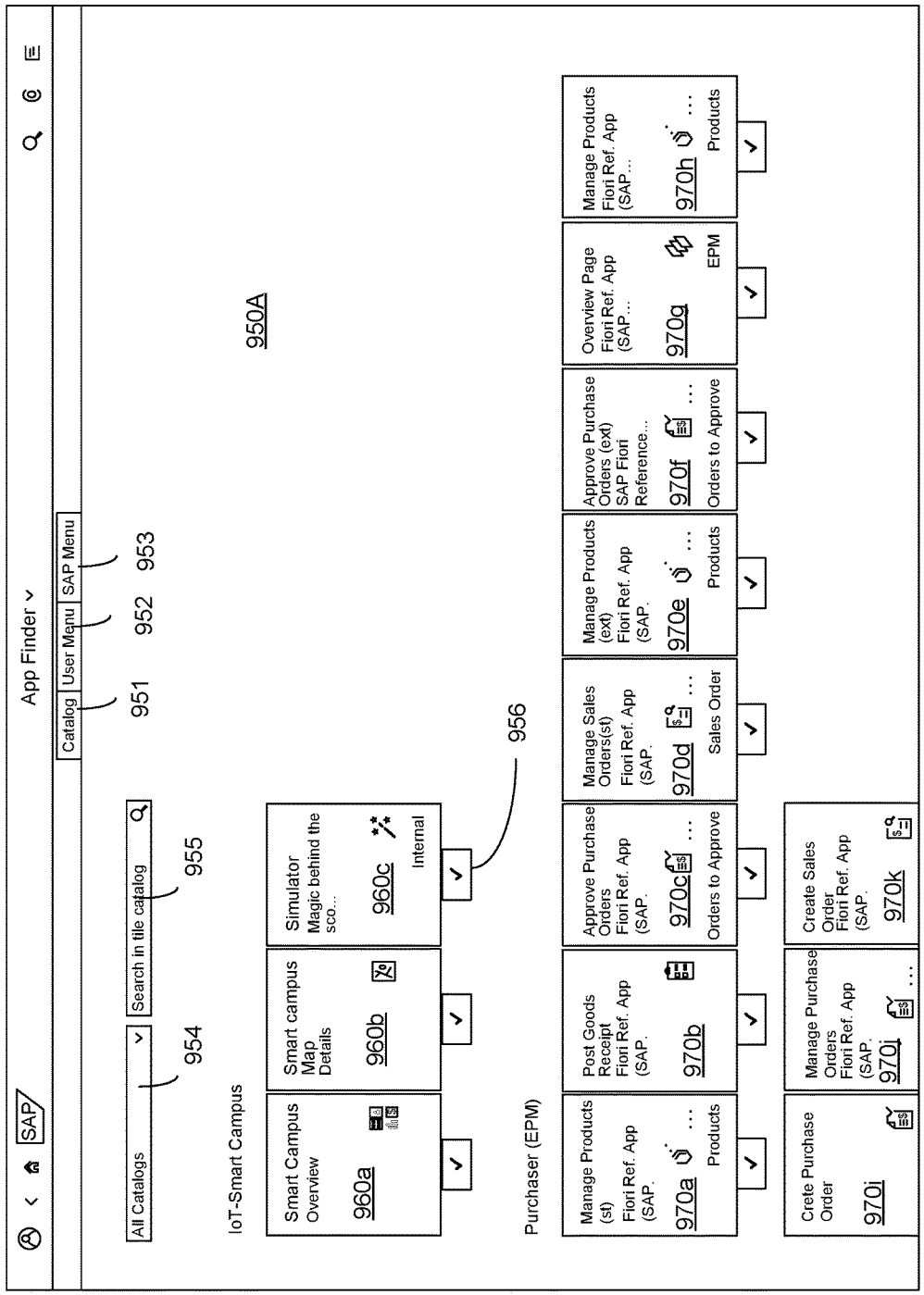
FIG. 9B is an illustration of an example app finder interface that may be displayed on a common UI after the user activates an app finder tile, in accordance with the principles of the present disclosure.

An example app finder application may be an "app store"-like interface (web page) that will list all the apps that a user might potentially use. FIG. 9B shows an example app finder interface 950A that may be displayed on common UI 100 after the user activates app finder tile 151, in accordance with the principles of the present disclosure. Applications shown in app finder interface 950A may be organized under tab 951 (catalog), tab 952 (user menu), and tab 953 (system menu).

In example implementations, the applications that may be displayed under tab 951 (catalog) may include, for example, all applications that an administrator may have added to an application catalog (e.g., tile catalog) available on system servers. These applications may be the same applications that typically appear in a user catalog on the user's Launchpad or home page (e.g., home page 900). The applications content may be organized into catalog groups. A search field (e.g., field 954) and a group selection option (e.g., option 955) may help users to locate specific tiles.

FIG. 9B shows, for example, under tab 951 (catalog), a catalog page a set of application tiles 960a-960c under the heading "IoT Smart Campus", and a set of application tiles (970a-970k) under the heading "Purchaser (EPM)." The user may select one or more of these tiles on app finder interface 950A to add new applications (tiles) to his or her home page (e.g., home page 900).

Like other web pages (e.g., home page 900, overview pages, application pages, etc.) in common UI 100, a catalog page (e.g., app finder interface 950A) may have a responsive and adaptive layout that can self-adjust to fit the display screens of diverse sizes. In an example implementation of the catalog page, smaller tiles may appear on smaller screens so that at least two tiles can be shown side by side.

Each tile in the app finder interface may offer two actions. First, clicking on a tile (e.g., tile 960a) may take the user to the application or page that the tile represents. This behavior or action may be the same as clicking on a tile (e.g., tile 151) on the home page (e.g., home page 900) to launch an application. Second, each tile in the app finder interface may include an "add" action icon (e.g., icon 956) connected to the tile. Activating the add action icon (e.g., icon 956) may allow the user to add the tile to a group on the home page (e.g., home page 900). In an example implementation, activating the add action icon (e.g., icon 956) may open a popover screen displaying a dialog that the user can utilize to select one or more home page groups (e.g., tiles area 910 or tiles area 920, etc. in home page 900) to which the tile should be added.

Figure 9C:
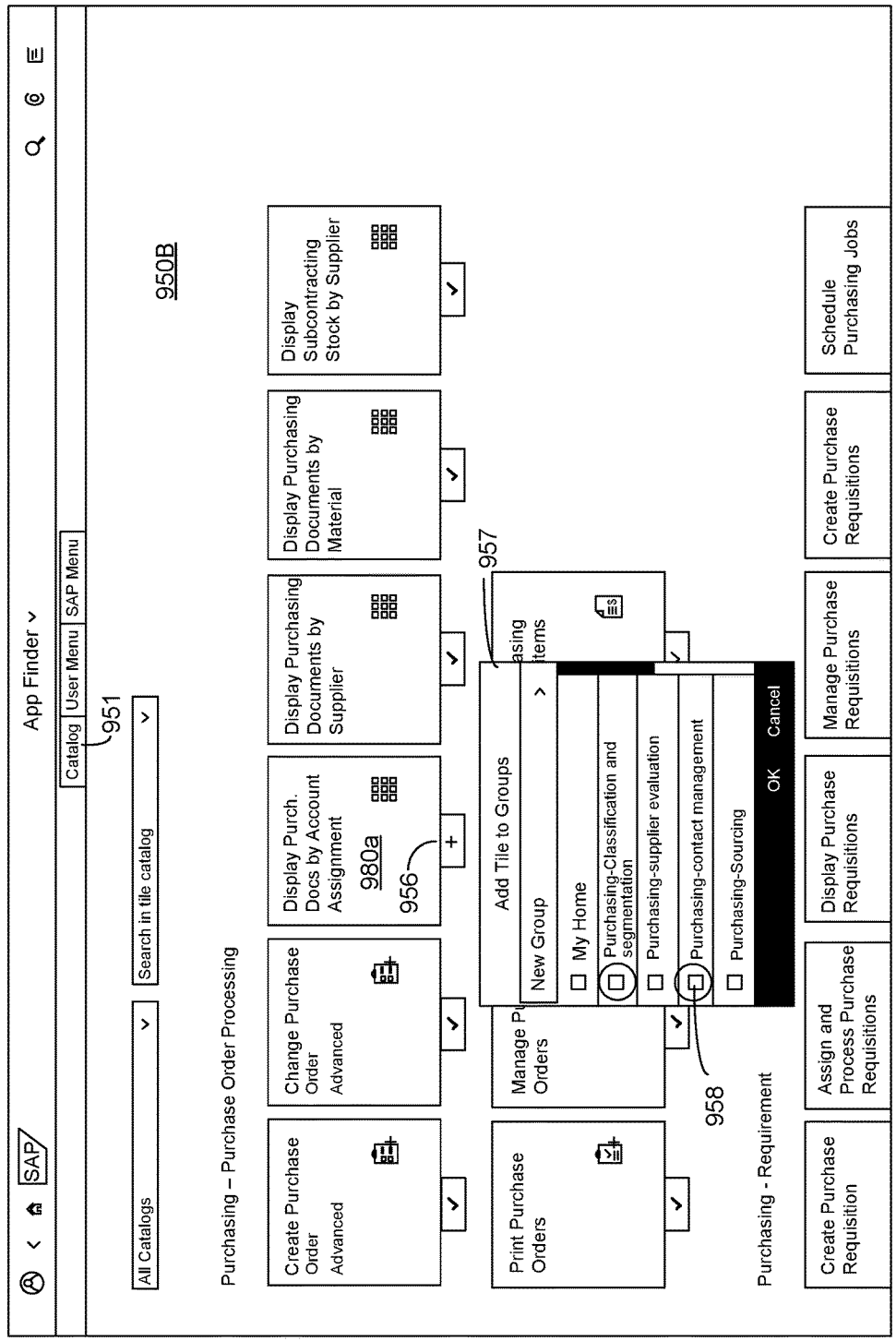
FIG. 9C is an illustration of an example catalog page, which includes an application tile with an add action icon connected to the tile, in accordance with the principles of the present disclosure.

FIG. 9C shows, for example, another catalog page (e.g., app finder interface 950B) under tab 951 (catalog), which includes an application tile 980a with an add action icon (icon 956) connected to the tile. Upon activation of icon 956, a popover screen (e.g., popover screen 957) may be displayed to the user. Popover screen 957 may include a dialog that allows the user to add application tile 980a to one or more home page groups (e.g., "My Home", "Purchasing—Classification and Segmentation," "Purchasing—Supplier Evaluation," "Purchasing—Contract Management," and "Purchasing—sourcing," etc.). The user may select a particular group to which application tile 980a should be added, for example, by checking a checkbox 958 next to the particular group in the dialog in popover screen 957. In example implementations, the dialog in popover screen 957 may also include an indication of which home page groups already have application tile 980a. The may remove an existing application tile 980a from a home page by unchecking the corresponding checkbox 958 in the dialog in popover screen 957.

In example implementations, the applications that may be displayed under tab 952 (user menu), may include, for example, all applications that have been assigned to a user (e.g. based on domain or user role) in a specific system. These may be the applications that a user would find in a user menu (e.g. based on domain or user role) when logged on to the specific system. The application content under tab 952 (user menu) may be organized into hierarchical menu folders.

Figure 9D:
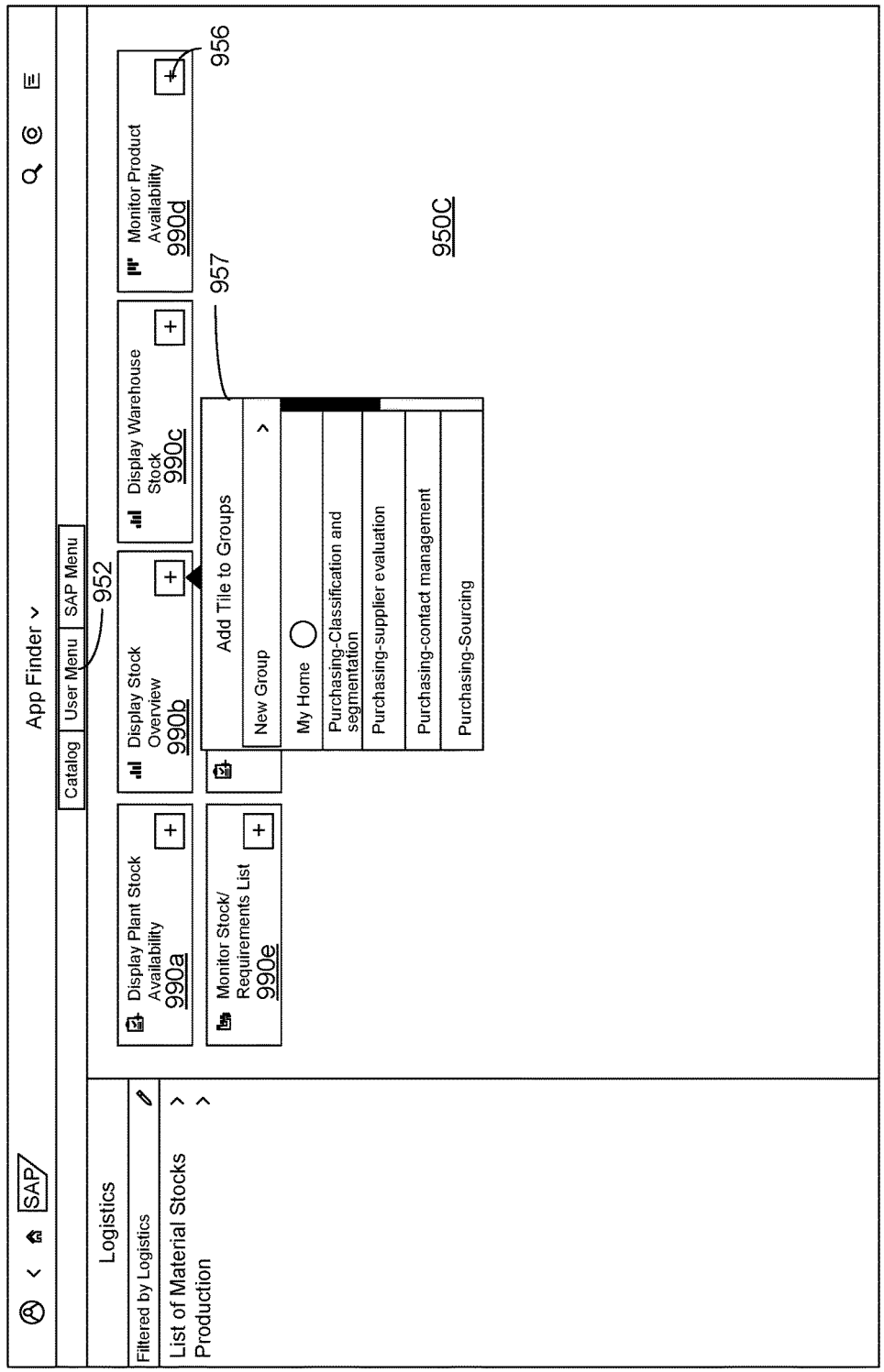
FIG. 9D is an illustration of an example catalog page, which includes application tiles corresponding to all applications that have been assigned to the user (e.g. based on domain or user role) in a specific system, in accordance with the principles of the present disclosure.

FIG. 9D shows, for example, a catalog page (e.g., app finder interface 950C) under tab 952 (user menu), which includes application tiles (e.g., tiles 990a-990e, etc.), which may correspond to all applications that have been assigned to the user (e.g. based on domain or user role) in a specific system, in accordance with the principles of the present disclosure. Each of the application tiles (e.g., tiles 990a-990e, etc.) may have an add action icon (icon 956) connected to the tile. Upon activation of icon 956, a popover screen (e.g., popover screen 957) may be displayed to the user. Popover screen 957 may include a dialog that allows the user to add the application tile to one or more home page groups (e.g., "My Home", "Purchasing—Classification and Segmentation," "Purchasing—Supplier Evaluation," "Purchasing—Contract Management," and "Purchasing—Sourcing," etc.) in a manner that is similar to that discussed above (FIG. 9C) for adding tile 980a to one or more home page groups.

In example implementations, the applications that may be displayed under tab 953 (system menu), may include, for example, all applications in the system, regardless of whether any of the applications have been assigned to the user, or if the user has access to them. The applications content shown under tab 953 (system menu) may be role-independent and therefore displays the same content for all users. The application content under tab 953 (system menu) may be organized into hierarchical menu folders.

The user can browse and discover application displayed, for example, under tabs 951-953, and add these to the home page. Further, through app finder interface 950, the user can launch or access less-frequently-used applications (tiles) that may, for example, not have been explicitly added to the user's home page.

In SAP systems, app finder interface 950 may be the main place for finding SAP Fiori, SAP GUI, and Web Dynpro ABAP apps all in one place. App finder interface 950 may provide three content areas: Catalog, User Menu, and SAP Menu (e.g., under tabs 951, 952 and 953, respectively). Users may find SAP Fiori apps under Catalog. The User Menu and SAP Menu may provide users access to SAP GUI and Web Dynpro ABAP applications retrieved from these two menus in the ABAP backend.

Overview Page (OVP) and Cards

The client computer device-user interface (UI) structure or framework described herein, in addition to common UI 100 (Launchpad), may provide one or more Overview Page UIs (or simply "OVP") to enhance UX while interacting with or navigating through the suite of multiple applications. Each OVP may be domain-specific and user-specific.

As described above, the Launchpad may serve as an entry point to applications on mobile or desktop devices. The Launchpad may display various tiles and links with each tile or link representing an application (e.g., transactions, analyses, fact sheets, smart business etc.). Clicking on a tile on the Launchpad may launch the represented application. An OVP may be one such application opened from the Launchpad (e.g., by clicking on an "OVP" tile or web browser link).

The OVP may provide the user with an overall view of a subject matter, with updated data (e.g. statuses, KPIs, recent transactions, etc., retrieved from the backend system/applications) presented in an easy-to-read format and may include calls to action. The updated data may be presented on one or more cards in the OVP. The cards may be displayed in the form of a list, table, chart, etc. A card may allow the user to take immediate actions (e.g. approving a purchase order) without launching an additional application. A card may include user-activable "actions" UI elements that allow the user to initiate actions related to the card content.

An OVP, which may be domain-specific and user-specific (e.g., user role specific), may be a selectable application or a run time web page (selectable, for example, from the Launchpad as an OVP tile or a web browser link). The OVP may collect, combine and provide a visual summary of data, links, actions, and content, which is relevant, for example, to a user's domain expertise and his or her selected roles within the domain. There may be multiple OVPs. Each OVP may display user-pertinent live content to the user for a respective domain of interest. The user may be able to view at-a-glance, in one place, all the information needed or relevant to the user's work in a domain or role. With the OVP, the user may not have a need to open individual applications and perform numerous drill downs through individual applications and application content to hunt-down the information needed or relevant to the user's work in the domain.

The OVP may present views of both analytical and business-process related data through the lens of cards (small containers of actionable content). The OVP allows users to take actions immediately on some entries, without having to drill down to the underlying apps. It also guides users to the apps relevant for addressing an issue or getting the needed work done.

Figure 10A:
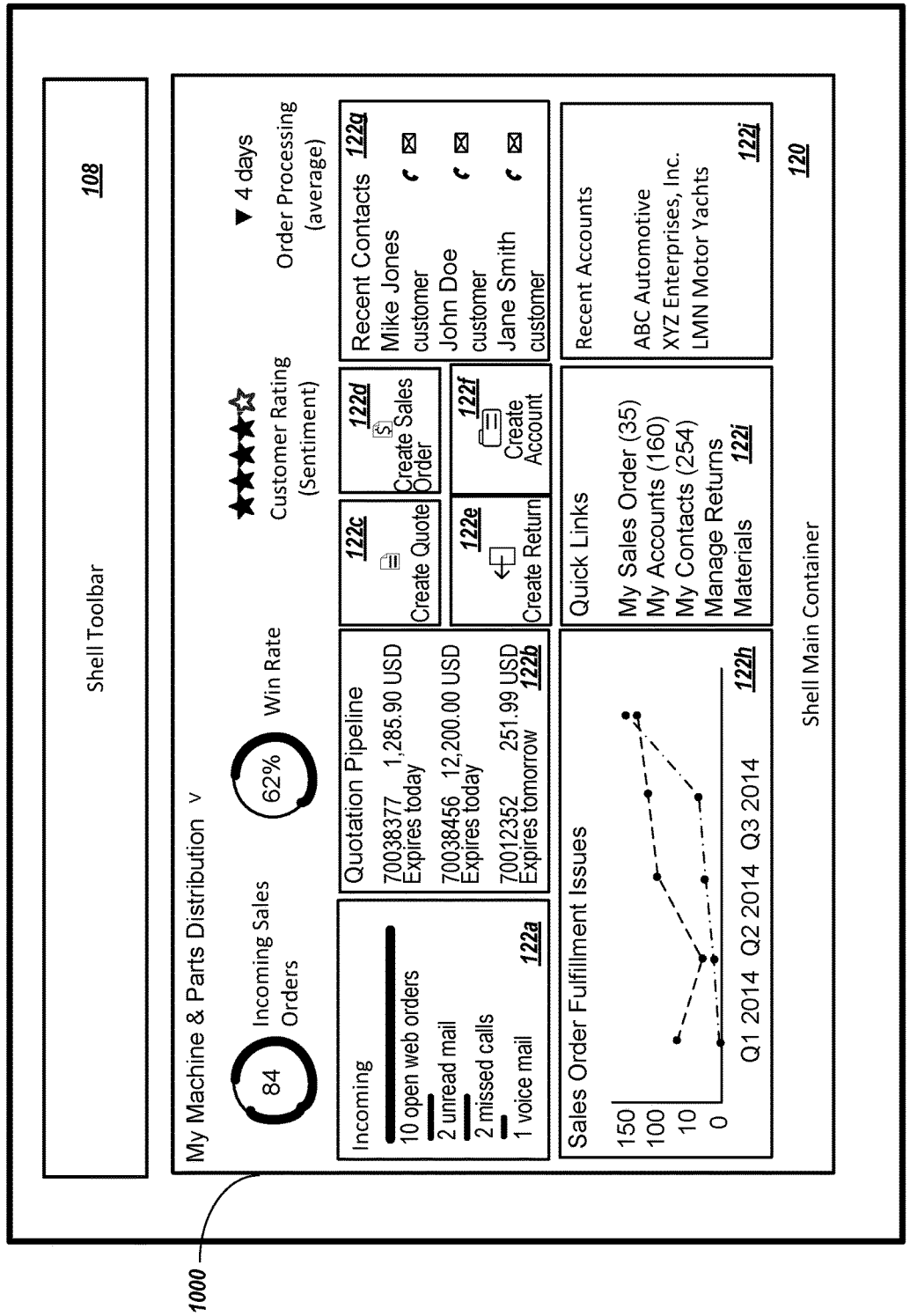
FIG. 10A is an illustration of an example overview page (OVP), which displays domain-pertinent and user-pertinent (e.g. for a "sales" domain) to a user, in accordance with the principles of the present disclosure.

FIG. 10A shows an example OVP 1000, which displays domain-pertinent and user-pertinent (e.g. for a "sales" domain) to a user, in accordance with the principles of the present disclosure. Example OVP 1000 may include an arrangement or mosaic array of cards (e.g., cards 1020-1040, etc.) to present domain-pertinent and user-pertinent content to the user. The cards may include, for example, Variable Content Packages (VCP) cards. The displayed OVP content may be determined by the system, a user, or an administrator's selection of Domain(s) and Role(s) via, for example, a Settings UI in the Launchpad, and additionally by the OVP application itself. This may ensure that the OVP content maintains relevance to the individual user and the way he or she works. The mosaic layout of VCP cards UI and corresponding content displayed within a VCP card in the OVP may be personalized by the user or administrator.

As shown in FIG. 10A, overview page 1000 may be displayed in the shell main container (e.g. viewport or Launchpad "Work" 120, FIG. 1). Enterprise applications that can be accessed by a user by way of the Launchpad 120 and then subsequently displayed in an active application screen (e.g., OVP 1000) can include, but are not limited to, transactional applications, analytical applications, and fact sheet applications (contextual navigation applications). Transactional applications can allow a user to create, change and/or approve processes with guided navigation. Analytical applications can provide a user with a visual overview of a dedicated topic for monitoring and tracking purposes to allow for further key performance indicator (KPI) related analysis. Fact sheet applications can allow a user to view essential information about an object and to allow navigation between related objects.

OVP 1000 can visualize all of the information a user may need for a specific business context (business domain) on a single page or screen. The information can be displayed in one or more variable content packages (VCPs) or cards 122a-j. Each card can be a container of content for organizing large amounts of information on an equal plane within the overview page. In some implementations, a user can rearrange the position of the cards 122a-j in the overview page. In some implementations, a user can define, add, or delete cards included in the overview page.

An overview page (e.g., OVP 1000) can be a selectable application (e.g., from Launchpad "Work" 120) providing an integrated gateway to view enterprise applications and application content included in the Launchpad. The UI element (e.g. tile) of the overview page (e.g., OVP 1000) can provide a user with a visual summary of data, links, actions, and content that are relevant to a business domain of expertise of a user and relevant to a selected role of the user within the domain. The visual summary can be presented in one or more cards (e.g., the cards 122a-j) that display live content to a user at-a-glance without the user having to open multiple applications and perform multiple drill downs through applications' content to find relevant content.

Figure 10B:
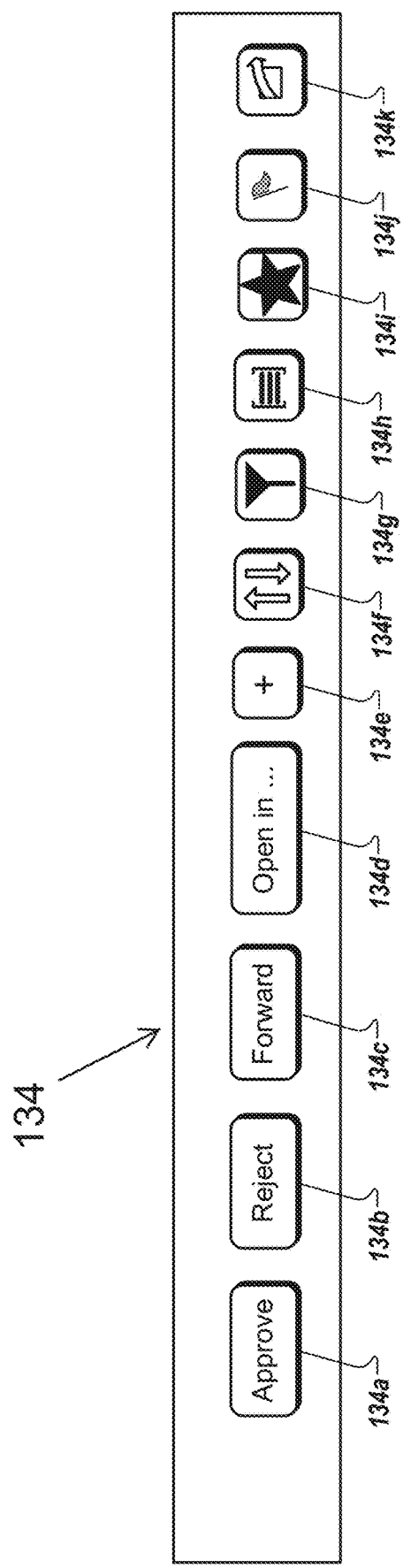
FIG. 10B is an illustration of an example a footer toolbar can appear to float over or below the content displayed, for example, in a home page, overview page, card, or component of a common UI, in accordance with the principles of the present disclosure.

In some implementations, the overview page can include a footer toolbar (e.g., footer toolbar 134 as shown in FIG. 10B). Footer toolbar 134 may for example, include one or more user-activable UI elements or "actions" (e.g., actions 134a-134K, etc.). In some implementations, the footer toolbar can appear to float over or below the content displayed in OVP 1000.

In some implementations, an enterprise system can determine content displayed on an overview page (e.g., OVP 1000). In addition or in the alternative, a selection of one or more business domains and one or more roles of a user in the business or enterprise can determine content displayed on an overview page (e.g., OVP 1000). In some implementations, a user can make the selection using a setting UI included in a Launchpad (e.g., Launchpad 120). In some implementations, a user can select one or more business domains and/or one or more roles of the user in the enterprise by way of an overview page (e.g., OVP 1000). Selecting one or more business domains and/or one or more roles of the user in the enterprise by way of the overview page can maintain absolute relevance to the individual user and the way in which the user works.

In some implementations, the user can personalize the layout and placement of one or more cards (e.g., the cards 122*a-j*) included in a UI of an overview page (e.g., OVP 1000) and the display of content included in each card. The personalization can enhance the workplace productivity of the user.

A few differences between the home page (Launchpad) and OVP in an example implementation of common UI 100 are listed below:

Launchpad: Framework; Single point of entry for a user to access all applications of all roles the user is assigned to; No specific business context or filter, no business specific actions (e.g., approve purchase order) possible on a tile; Limited context information available (e.g., number of new workflow items); One Launchpad per user; Given, Only available tile types can be shown.

OVP: Application; Deeper insights and context information for one specific business context; Ability to filter across all cards (e.g. Plant, Purchase Order . . . ), Micro-Actions are possible on cards to perform easy and quick tasks (e.g. approve or reject purchase order) directly on the OVP; More information for the specific context available (e.g. more details for the first workflow items); Multiple OVPs per user possible (e.g., depending on role assignment or use cases); Optional; Application specific card types can be implemented; third party content could be embedded as well.

A card used in OVP 1000 may be an atomic unit of content which can be consumed across multiple devices; desktop through wearable technologies. The cards used in an OVP may be of different types, for example:

A Grouped Object card may be container for a related set of objects [or links] providing quick navigation to details and/or actions A Single Object card may represent a single object or data point. May be informational (read-only) or actionable.

A Stack may be a collection of Single-Object Cards based on a topic or action, which can be opened to browse Single Card objects.

The system may provide users the ability to add or delete cards, and to add/select cards from a catalog and add them to the OVP. Users or administrators may be able to add or edit filters for a specific card to filter displayed content, resize cards, and create their own personalized OVP (e.g., using a GUI tool that allows stakeholders to create their own OVP's and cards). A card on the OVP display may have a fixed height, or a flexible height (e.g., to adjust to variable content amount). Further, the flexible height card may, for example, have vertical scrolling enabled in the content area displayed (e.g., iframe) to allow a user to scroll content and visualize different portions of content which does not fit in one view of the card.

Any single-entity card on the OVP can have actions displayed. Cards may have simple actions like "approve", or more complex actions. For Function-Import actions with parameters, the card behavior may include that when an action is taken (e.g., user clicks on an action), the card transforms into a modal dialog (this is responsive for all call form factors) to allow the action to be taken. The modal dialog may have only two possible choices, for example, the action prescribed in the card footer action area, and a Cancel action.

A card may behave differently based on the type of action the application specifies. However, the behavior may not be controlled by the OVP, but may be set by the card's parent application which controls the logic of the card actions. For example, navigation actions may be set as multiple-click. Function-Import action may be set as 1 click or multiple-click depending on the use case. Multiple-click action menu items may be clicked over and over again. Once a 1-click action is taken the card in no longer needed and may disappear from the OVP.

Figure 11:
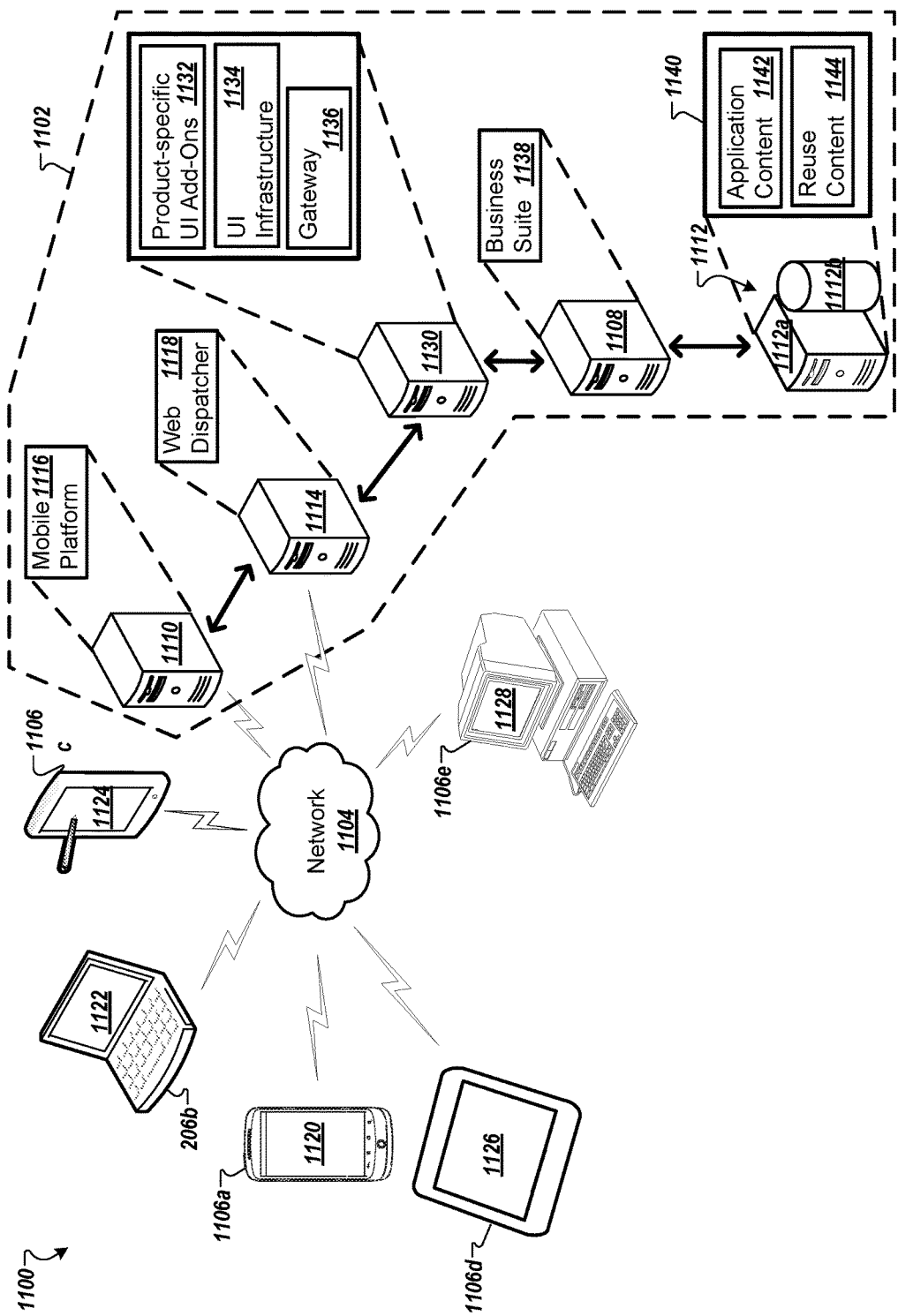
FIG. 11 is a schematic illustration of an example system that can implement the user interfaces and provide the user experiences described herein, in accordance with the principles of the present disclosure.

FIG. 11 is a diagram of an example system 1100 that can implement the user interfaces and provide the user experiences described herein, in accordance with the principles of the present disclosure. System 1100 includes an enterprise computing system 1102, a network 1104, and client computing devices 1106*a-e*.

For example, computing device 1106*a* can be a mobile phone, a smartphone, a personal digital assistant, or other type of mobile computing device. Computing device 1106*a* includes a display device 1120. For example, computing device 1106*b* can be a laptop or notebook computer. Computing device 1106*b* includes a display device 1122. For example, computing device 1106*c* can be a tablet computer. The computing device 1106*c* includes a display device 1124. For example, the computing device 1106*d* can be a wearable device such as a smartwatch. The computing device 1106*d* includes a display device 1126. For example, the computing device 1106*e* can be a desktop computer. The computing device 1106*e* can include a display device 1128. A user of the computing devices 1106*a-e* can use/interface with the display devices 1120, 1122, 1124, 1126, and 1128, respectively, when interacting with the enterprise computing system 1102. The computing devices 1106*a-e* can display any of the screens and UIs described herein on display devices 1120, 1122, 1124, 1126, and 1128.

Enterprise computing system 1102 can include one or more computing devices such as a web management server 1114, a frontend server 1130, a backend server 1108, and a mobile device management server 1110. The enterprise computing system 1102 can also include a database management computing system 1112 that includes a database management server 1112*a* and a database 1112*b*. Though not specifically shown in FIG. 11, each server (the web management server 1114, the frontend server 1130, the backend server 1108, the mobile device management server 1110, and the database management server 1112*a*) can include one or more processors and one or more memory devices. Each server can run (execute) a server operating system.

In some first implementations, the client computing devices 1106*a-d* (e.g., the mobile computing devices) can communicate with the enterprise computing system 1102 (and the enterprise computing system 1102 can communicate with the client computing devices 1106*a-d*) by way of the mobile device management server 1110. The mobile device management server 1110 includes one or more mobile device platform application(s) 1116. By using the mobile device platform application(s) 1116, the enterprise computing system 1102 can deliver cross-platform, secure, and scalable applications to the computing devices 1102*a-d*, independent of the mobile computing device-type (e.g., laptop, notebook, smartwatch, mobile phone, PDA, etc.) and independent of the operating system running on the computing device 1106*a-d*. In these implementations, the mobile device management server 1110 can then communicate with the web management server 1114.

In some second implementations, the client computing devices 1106*a-e* (both the mobile computing devices (computing devices 1106a-d) and the desktop computing device 1106e) can communicate with the enterprise computing system 1102 (and specifically with the web management server 1114), and the enterprise computing system 1102 (and specifically with the web management server 1114) can communicate with each of the client computing devices 202a-e) using the network 1104. The web management server 1114 includes a web dispatcher application 1118. In both the first implementations and the second implementations, the web dispatcher application 1118 can act as a "software web switch" accepting or rejecting connections to the enterprise computing system 1102.

In some implementations, the network 1104 can be a public communications network (e.g., the Internet, cellular data network, dialup modems over a telephone network) or a private communications network (e.g., private LAN, leased lines). In some implementations, the computing devices 1106a-e can communicate with the network 1104 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The frontend server 1130 can include product specific UI Add-On Applications 1132 and a UI infrastructure 1134. The UI infrastructure 1134 can include a design portion and a runtime portion. The frontend server 1130 can decouple a lifecycle of a UI (e.g., design and runtime deployment) from the backend server 1108. The decoupling can allow UI applications to interface with a plurality of different databases. The decoupling provides a single point of UI design, access, and maintenance allowing for theming, branding, configuring, and personalizing a UI without a need for development privileges to the backend server 1108 (e.g., no need to have backend administrative rights). The decoupling can result in a more secure enterprise computing system. The decoupling can provide for rule-based dispatching of requests in a multi-system landscape (e.g., for approvals including aggregation).

The frontend server 1130 includes a gateway 1136. The gateway 1136 can provide a way to connect devices, environments, and platforms to enterprise software based on market standards. The gateway 1136 can enable the development of UIs for use in different environments (e.g., social and collaboration environments). The gateway 1136 can enable the development of UIs for use on different types of client computing devices (e.g., client computing devices 1106a-e). The gateway 1136 can enable the development of UIs for use in internet-based applications.

The backend server 1108 can include a bundle (a set) of business applications (e.g., business suite 1138). The business applications can be transactional applications, analytical applications, and fact sheet and contextual navigation applications, etc. Transactional applications can allow task-based access to tasks that can include create and change. In addition or in the alternative, transactional applications can allow access to entire processes with guided navigation. Analytical applications can provide a user with a visual overview of complex tasks for monitoring and tracking purposes. Fact sheet applications and contextual navigation applications involve search and explore activities. Fact sheet applications and contextual navigation can allow a user to view essential information about an object and can allow contextual navigation between related objects.

The database management computing system 1112 includes a database management server 1112a that can run (execute) applications that can manage a database 1112b. For example, the database 1112b can be an in-memory, column-oriented, relational database (e.g., SAP HANA®). The database management computing system 1112 can include extended application services 1140 that can embed a full featured application server, web server, and development environment within the database management computing system 1112. The extended application services 1140 can include application content 1142 and reuse content 1144 for use by the enterprise computing system 1102 when providing a personalized, responsive, and simple UX across different types of computing devices and deployment options.

Figure 12A:
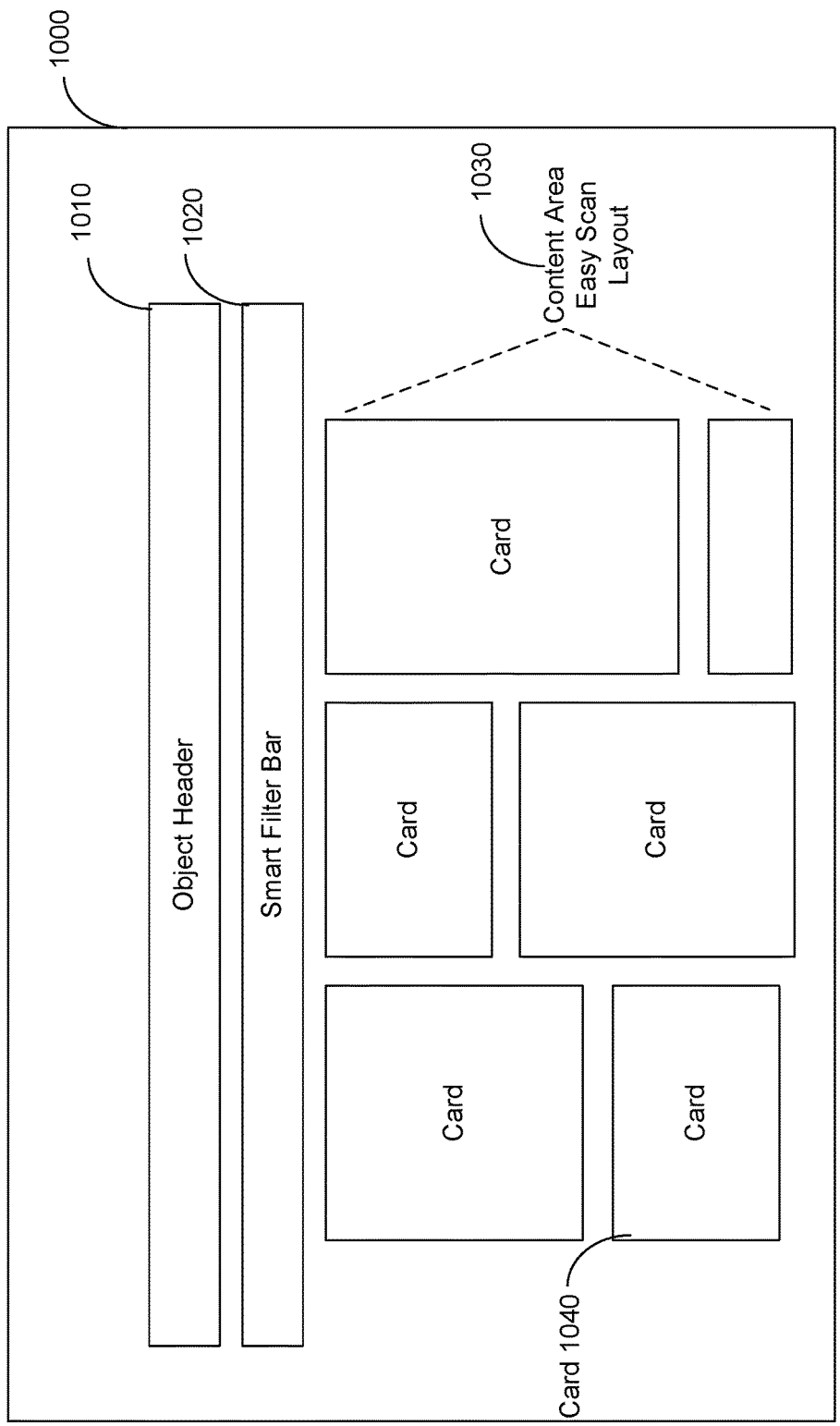
FIG. 12A is an illustration of an example floorplan of an Overview page, in accordance with the principles of the present disclosure.

FIG. 12A shows an example layout or floorplan 1200A of an example overview page (e.g., OVP 1000) which may constructed, for example, using system 1100, in accordance with the principles of the present disclosure. According to example floorplan 1200A, overview page 1000 may include an object header 1010, a smart filter bar 1020 and a content area 1030.

OVP 1000 may use the control defined as Object (Page) Header 1010 for a page header. The header may be the top-most element of the floorplan layout 1200A and may include context and relevant information about the page it represents. The information allowed in header for OVP 1000 may be limited to a title, an optional subtitle, and an icon button used to open or launch smart filter bar 1020.

OVP 1000 may use a control (e.g., smart filter bar 1020) to provide capabilities to users to filter application information or content displayed in the overview page. A user-activable smart filter bar 1020 may analyze a Meta document of an OData service and render a filter bar configured to filter content displayed on OVP 1000. Smart filter bar 1020 in floorplan 1200A may, for example, include functions and behaviors of UI5 control (e.g., SAPUI5: UI Development Toolkit for HTML5) including Variant Management.

Smart filter bar 1020 may be used to filter all the content displayed on OVP 1000. In an example implementation, smart filter bar 1020 may not visible when the overview page is first loaded. A user may have to select a filter icon from object (page) header 1010 to cause smart filter bar 1020 to appear on the overview page. On a desktop (or large screen client device), smart filter bar 1020, once invoked, may always be displayed in an "extended" or full-size mode. On a mobile (or small screen client device), smart filter bar 1020, once invoked, may always be displayed in "collapsed" or small-size mode.

Content area 1030 of OVP 1000 may include an arrangement of one or more cards (e.g., card 1040). Content area 1030 may, for example, contain responsive (collapsible) columns of cards in what may be referred to herein as the "Easy Scan" layout. The columns of cards may collapse, for example, to fit OVP 1000 to different size screens of the client devices on which OVP 1000 is to be displayed.

In example implementations of common UI 100, content area 1030 of OVP 1000 may not include any tiles (of application launchers) in the Content Area on the Overview Page. Only the home screen (e.g. launch pad 120) may offer access to apps, like the home screen of an operating system. The home screen may offer no further functionality to keep the home page clean and usable. Conversely, the content area 1030 of OVP 1000 may contain cards, but no tiles. However, cards have more than one interaction area and might even offer actions and are therefore much richer than tiles. Further, in an example implementation, a header area of a card (in OVP 1000) may include a user-activable UI element for launching an application related to the card.

In general, a card used in OVP 1000 is a container of application content. A Card may be a smart component that uses UI annotation to render its content, and is bound to a single data-source.

Figure 12B:
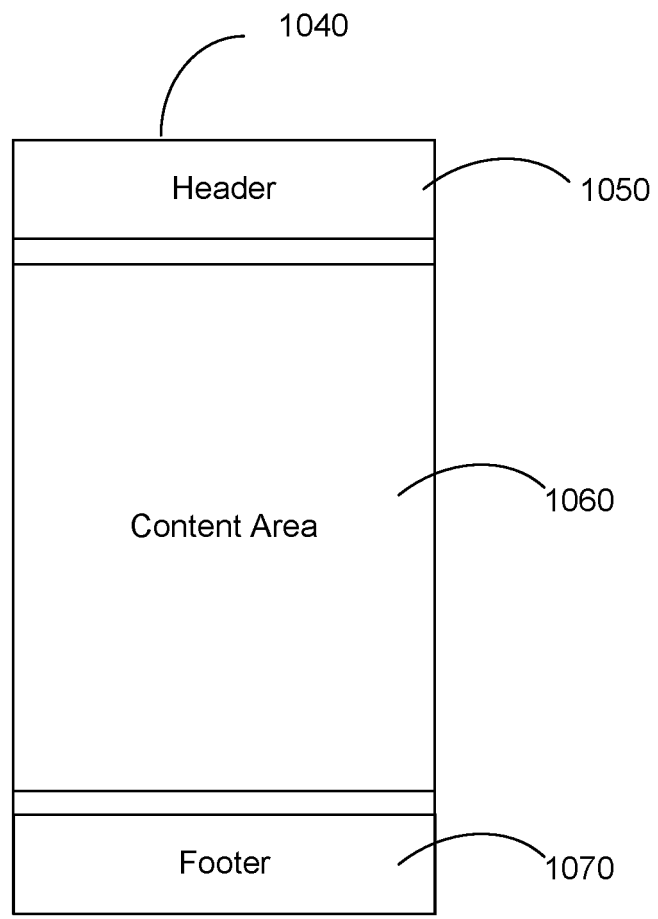
FIG. 12B is an illustration of an example floorplan of an example card that may be used in an overview page, in accordance with the principles of the present disclosure.

FIG. 12B shows an example layout or floorplan 1200B of an example card (e.g. card 1040) that may be used in the overview page (e.g., OVP 1000), in accordance with the principles of the present disclosure.

According to example floorplan 1200B, card 1040 may include a card header 1050, a card content area 1060 and card footer 1070. In some instances, card footer 1070 may be optional.

In floorplan 1200B, card header 1050 may serve as an identifier of card content (i.e. what the card content is all about). Card header 1050 may also be a user-activable UI element for navigating to the specific application or view from which the card content originates.

In example implementations, card header 1050 may contain, for example, up to 3 text fields (e.g., title, subtitle, and content source (i.e. the specific application)) for descriptive purposes. At least one of text field may be a required element. The height of card header 1050 may be variable. In example implementations, the card header may expand vertically to contain the text in the text fields.

A primary purpose of the text fields in card header 1050 in OVP 1000 may be to identify the content source (Title), to present the reason it is important to look at the card (Headline), to show any relevant parameters (Sub-title), and to provide navigation to the content source (an application). The headline may be a natural language reflection of the filtered/annotated view and may express the results of the card setting (e.g., "Net Sales is down 5.8% in Latin America." or "15 recent Sales Orders have issues blocking successful fulfillment," etc.).

In floorplan 1200B, card content area 1060 of card 1040 may be reserved for application content. The card content may be displayed in card content area 1060, for example, by embedding a UI5 control that specifies the properties and format of the data that is to be displayed (e.g., an embedded UI5 standard list control may provide formatting (row height, font sizes, etc.), as well as properties (number of blocks of text—one is for status, etc.).

In floorplan 1200B, card footer 1070, which may be optional, may appear, for example, at the bottom of a card. Card footer 1070 provides a location where UI elements (e.g., Actions) related to the card content can be placed, or where additional detailed information can be displayed. In some cards, no footer bar is needed—and in those cases, none need appear. For cards that are about a single Object or data point (e.g., Quick View, Chart, or Image cards) card footer 1070 can be used to display Actions associated to the content of the card. An example card footer 1070 may include one or more elements or actions similar to those shown in footer tool bar 134 (FIG. 10B). For cards displaying links to a group of multiple Objects (e.g., List or Table cards) the Footer is informational; and provides a summary text label which describes how many items.

Figure 13:
FIG. 13 illustrates pictorial examples of several card types (i.e. Quick View, Analytic, Image, List, Bar Chart List, Table and Stack) that may be used in an overview page, in accordance with the principles of the present disclosure.

Cards may differ in the content they display. Cards of different types may show an image, chart, list of items, table, informative text, or a combination of two elements (for example: KPI and chart), etc. FIG. 13 shows pictorial examples of several card types (i.e. Quick View, Analytic, Image, List, Bar Chart List, Table and Stack) that may be used in OVP 1000, in accordance with the principles of the present disclosure. Cards used in the Easy Scan layout are always of a uniform horizontal width, but can vary, based on card type, in vertical dimension. A vertical size (or column height) of card in OVP 1000 may be determined by the card type and the embedded control—flexible if a List or Table Card, or fixed if a Quick View, Chart, Analytic or Image Card.

Components or objects of common UI 100 (e.g., Launchpad 120, OVP 1000, cards etc.) may be constructed on a system (e.g., system 1100). One or more backend servers hosting a UI infrastructure (e.g., UI infrastructure 1134) may include UI frameworks and floorplans or layouts for the common UI (e.g., Launchpad 120, OVP 1000, cards etc.). The UI infrastructure may include, or coupled to, design tools that can be used to personalize (e.g., by domain or user role) the common UI. The one or more design tools including a tool that disposes, in the common UI, an overview page (OVP) element leading to a personalized overview page that visually displays, at a glance, application information and data visualizations for a specific work domain or role of the user.

The one or more design tools may include a tool that deploys the OVP element in the common UI as a user-activable tile or a web link leading to the personalized overview page.

The one or more design tools may include a tool that that includes, in the personalized overview page, displays of real-time application information and data visualizations of one or more applications running in the background.

The one or more design tools may include a tool that organizes displays of real-time application information and data visualizations in an equal plane within the personalized overview page.

The one or more design tools may include a tool that deploys cards as containers of content in the personalized overview page, the cards being deployed in a UI framework according to a template schema that allows application vendors to embed application specific content into the cards used in the personalized overview page.

The one or more design tools may include a tool that rearranges a card layout in the personalized overview page using a drag and drop feature to change a position of a card in the personalized overview page The one or more design tools may include a tool that deploys cards in the personalized overview page in a flexible card layout that features collapsible columns or rows of cards, and collapses the columns or rows of cards to fit the personalized overview page to a screen size on the client computing device.

The one or more design tools may include a tool that binds each card to a single application data-source and uses UI annotation to render the card's content.

The one or more design tools may include a tool that provides the personalized overview page with an object header including context information describing the personalized overview page, a user-activable smart filter bar control to analyze a meta document of an OData service and render a filter bar configured to filter content displayed on the personalized overview page, and a content area including collapsible columns of the cards, each card bound to a single application data-source.

The one or more design tools may include a tool that embeds a UI5 control that specifies the properties and format of the content that is to be displayed in the content area.

The one or more design tools may include a tool that configuring the identifier in a card as a navigation link to an application or view that is the data-source of the card content.

Further, the one or more design tools may include a tool that disposes, in the card, user-activable actions related to the card content.

Object Page

An aspect of the client computer device-user interface (UI) structure or framework relates to the construction or development of common UI 100 for multiple applications and individual components or objects of common UI 100 (e.g., Launchpad, OVP, tiles, cards, side panels, etc.) and other objects (e.g., informational objects, business objects, menus, search, design or settings tools, etc.) that may be used or shown in the applications.

The components or objects, which may be used or shown in the common UI applications, may depend on the domain and user role to support activities in the domain. An object can represent a business entity (e.g., a customer, a sales order, a product, an account, etc.). For example, for the domain Quality Management, the objects may include business objects for Quality Level, Worklist for inspection lots, Master Inspection Characteristic, Inspection Methods, Inspection Plan, Inspection Plan Operation, etc.).

System 1100/UI infrastructure 1132 may include an object page facility which provides information and facilitates construction or creation of individual components or objects of common UI 100 (e.g., Launchpad, OVP, tiles, cards, side panels, etc.) and other objects (e.g., informational objects, business objects, menus, search, design or settings tools, etc.) that may be used, or shown in or via, common UI 100.

Figure 14A:
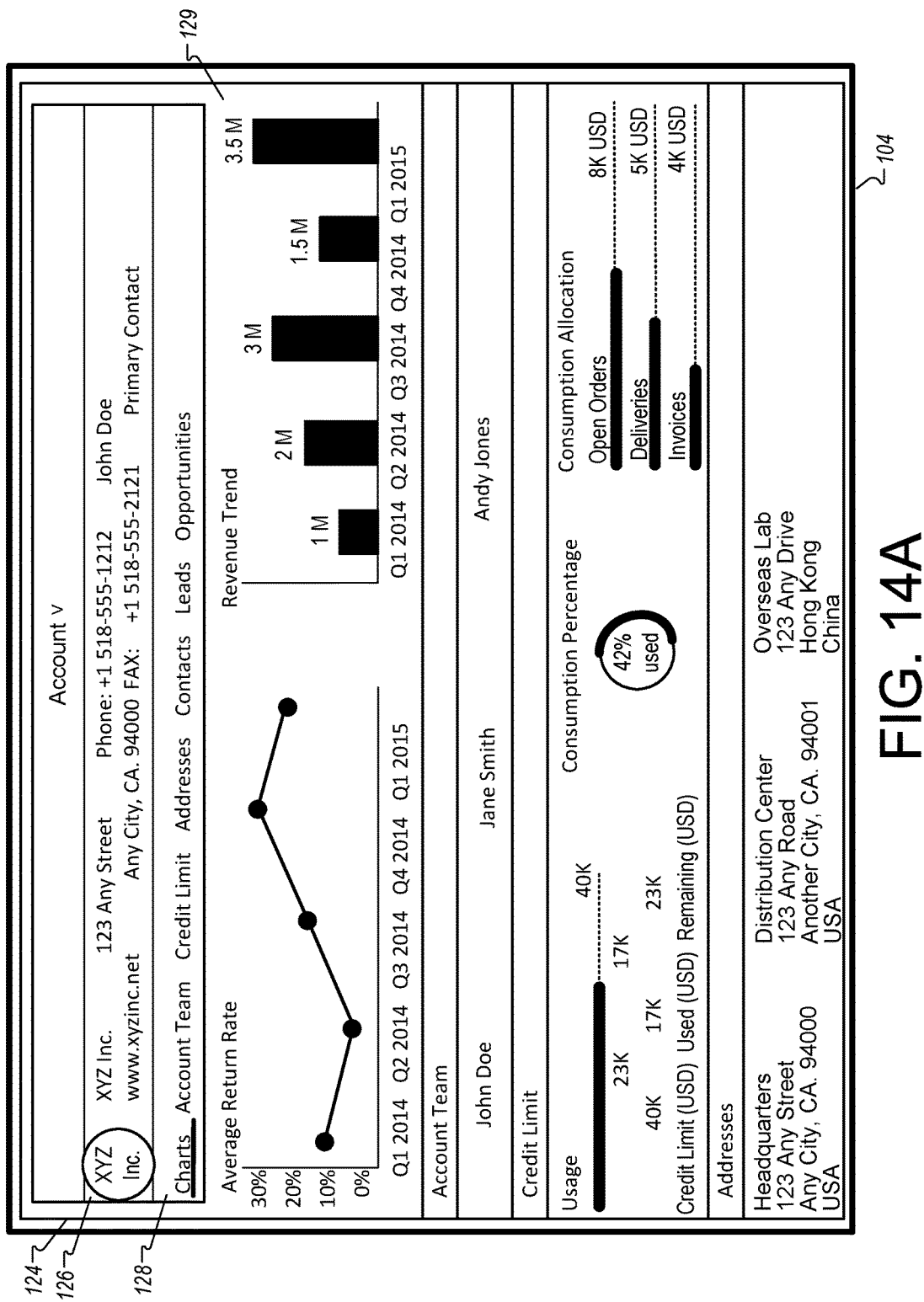
FIG. 14A is an illustration of an example floorplan of an example object page in a display mode and an example floorplan of the object page in a "create and edit" mode, in accordance with the principles of the present disclosure.
Figure 14B:
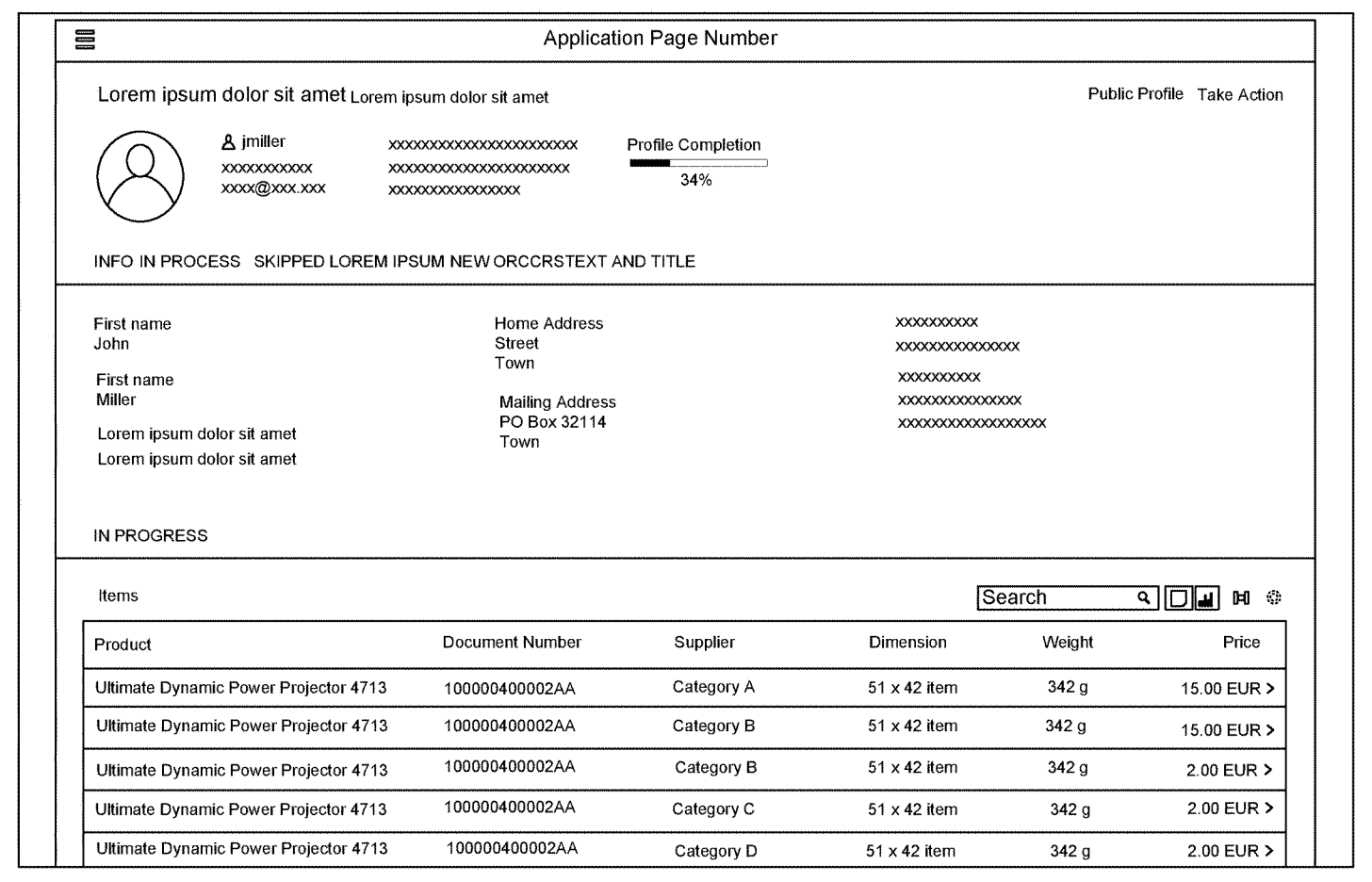

FIG. 14 is an illustration showing an example object page (e.g., object page 124) displayed in a shell main container 104. An object page can be a floorplan used to represent objects in a UI. An object page can be used to display, create, or edit an object. An object can represent a business entity (e.g., a customer, a sales order, a product, an account, etc.). Enterprise applications that reflect a specific scenario (e.g., a sales order, an account status) can be bundled using an object. The object page can include a header area 126, a navigation area 128, a content area 129, and, in some implementations, a footer toolbar (e.g., footer toolbar 134 as shown in FIG. 10B). In some implementations, the footer toolbar can appear to float over the content displayed in the object page 124.

In example implementations, the object page may be represented by a user-activable UI element (e.g., a tile or web link) on a home page, which a user can activate to display the object page.

In accordance with the principles of the present disclosure, a same floorplan (i.e., a common "object page") may serve as a starting point for the construction or development of common UI 100 and any of its components or objects. The object page may be used as a flexible, extensible container to represent objects of common UI 100. The object page may include a header area, a navigation area, a content area, and, in some implementations, a footer toolbar. An example object page may include a flexible header, an alternative anchor or tab navigation, and a flexible responsive layout.

Figure 15A:
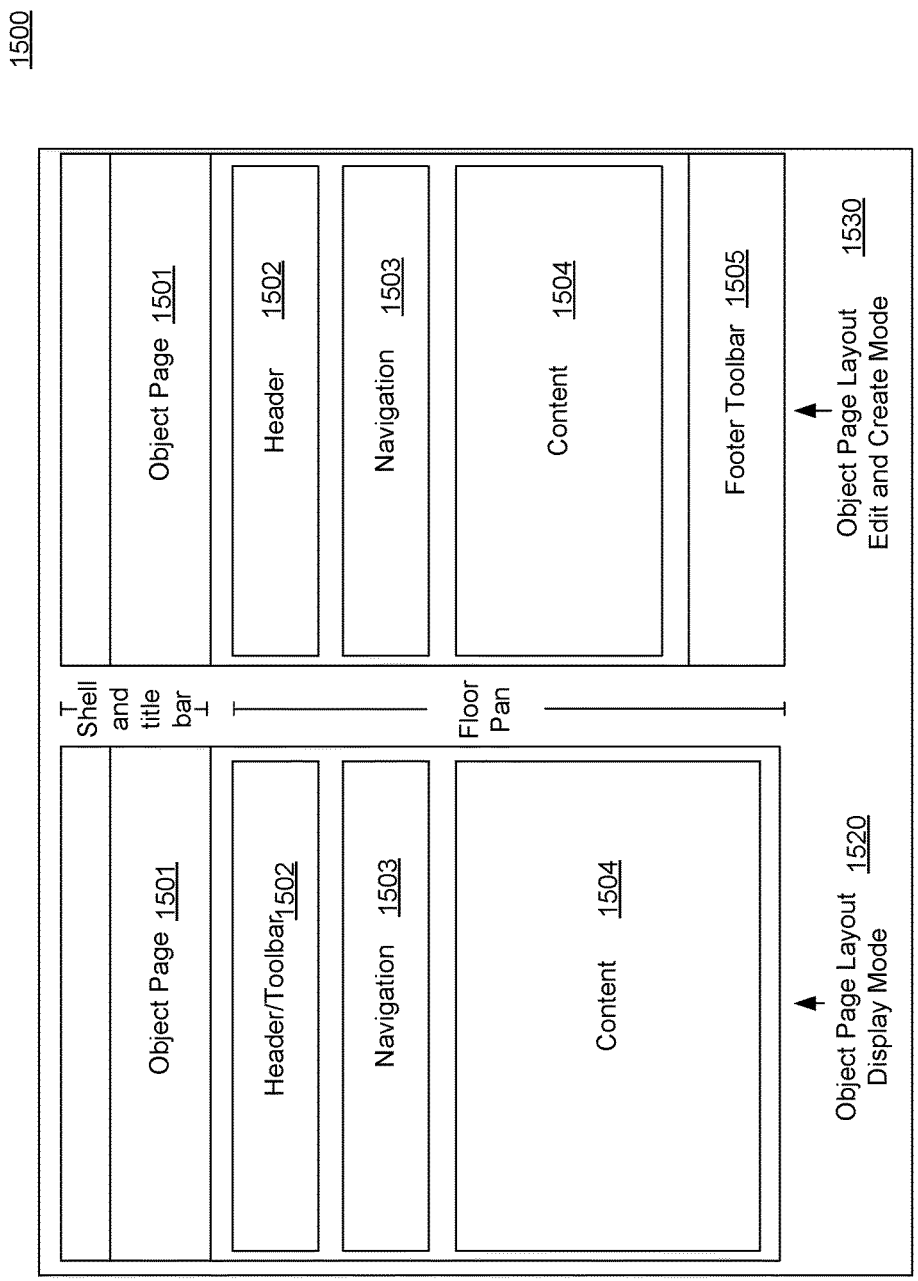
FIG. 15A is an illustration of a layout of an example object page in a display mode and a layout of the object page in a "create and edit" mode, in accordance with the principles of the present disclosure.
Figure 15B:
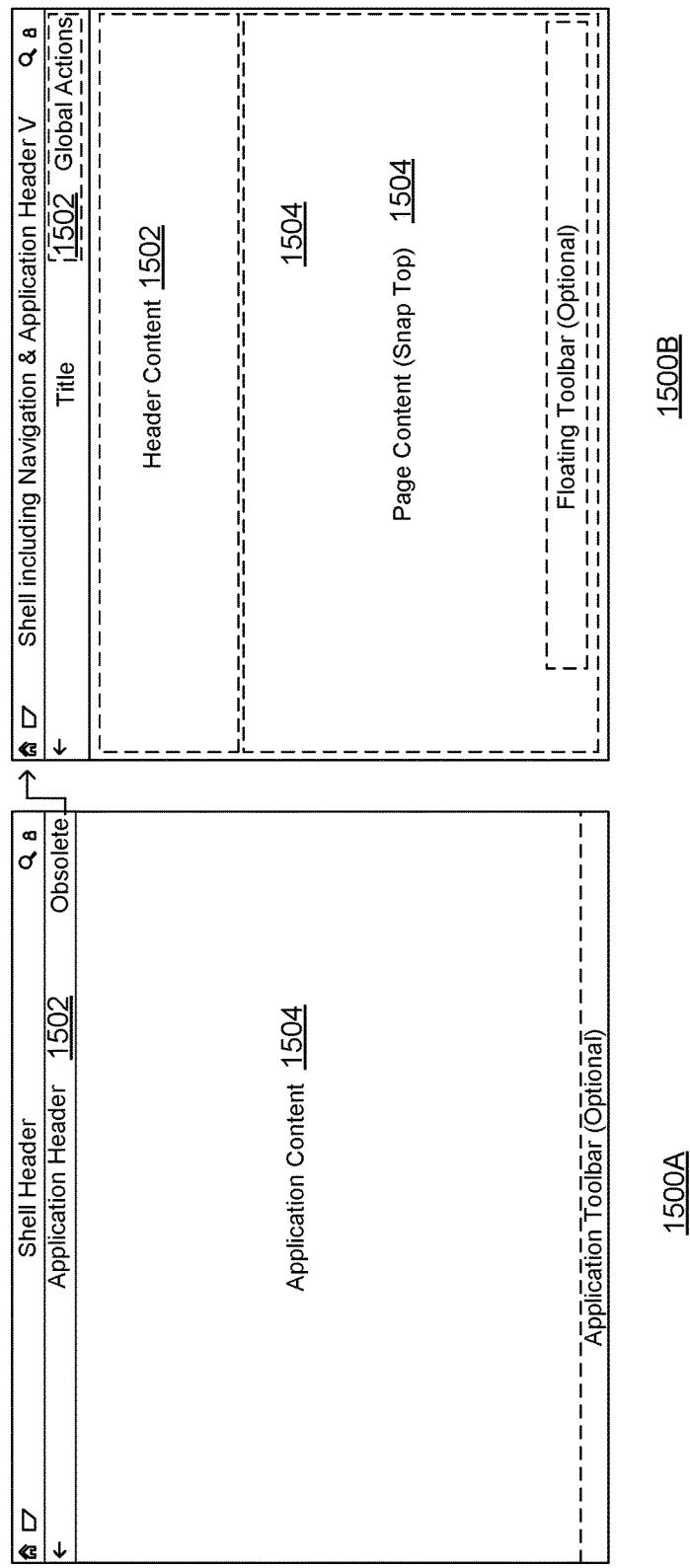
FIG. 15B is an illustration of a concept of a snapping header design of an object page compared to a non-snapping header design of an object page, in accordance with the principles of the present disclosure.

In an example implementation, the object page may include a snapping header and a page content area. The header may include a title area and a header content area. FIG. 15A schematically illustrates a layout 1520 of an example object page 1500 in a display mode and a layout 1530 of the object page 1500 in a "create and edit" mode, in accordance with the principles of the present disclosure. As shown in layout 1520, object page 1500 in the display mode may include a shell/title bar area 1501, a header/toolbar area 1502, a navigation area 1503 and a content area 1504. As shown in layout 1520, object page 1500 in the "create and edit" mode may include shell/title bar area 1501, header/toolbar area 1502, navigation area 1503 and a footer toolbar area 1505. In some designs of object page 1500, areas (e.g., header/toolbar area 1502) or other areas of the object page may be detachable or add-ons. FIG. 15B schematically illustrates the concept of a snapping header design of an object page 1500B compared to a non-snapping header design of an object page 1500A, in accordance with the principles of the present disclosure. The snapping header may snap close leaving only the title bar when the corresponding first UI object is scrolled, and thus expand the area available for content area display.

Figure 16:
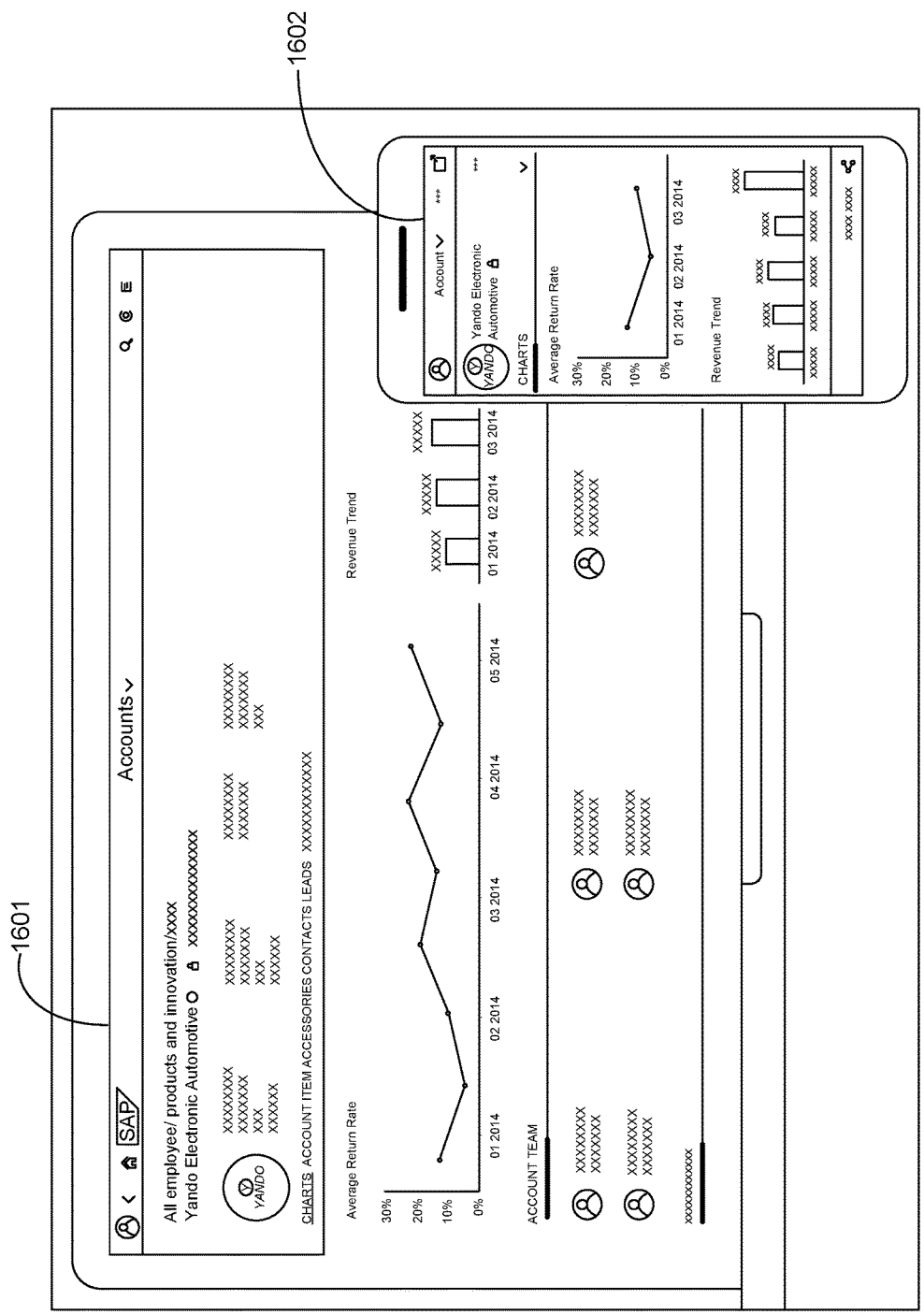
FIG. 16 shows an example object page displayed on a large screen device (e.g. a desktop) being automatically scaled as an object page to fit a small screen of mobile device, in accordance with the principles of the present disclosure.

The object page may have a full-page floorplan with a display mode, and a create & edit mode. The object page may be adaptable for a wide range of use cases and may be used to display, create and edit any object regardless of the object's complexity level. The object page may be designed to automatically adapt whenever needed to different resolutions (e.g., display screen sizes). The sizing, placement, location, arrangement, etc. of artifacts on or within an object page may be responsive, flexible, alterable, and dynamically configurable. Using fluid grids and layouts, flexible images, showing or hiding content, and media queries, the object page design may automatically adapt whenever needed to accommodate for the different resolutions (e.g., display screen sizes). FIG. 16 shows an example object page 1601 displayed on a large screen device (e.g. a desktop) being automatically scaled as an object page 1602 to fit a small screen of mobile device, in accordance with the principles of the present disclosure.

The object page may be used with either a facet (tabs) or flat (anchors) approach. The object page may serve as customizable 'lens' using a comprehensive filtering mechanism and may offer 'auto learning' capabilities based on evaluations of user input and a range of data, parameters, etc. to identify information (e.g., information relevant to a user or a user role).

An object page may reside, operate, etc. within a user interface on any target device including, for example, a desktop, a notebook, a tablet, a smart phone, a smart watch, etc. and may among other things dynamically adjust or adapt aspects of itself to account for any particulars (e.g., display real estate, input mechanism(s), etc.) of a target device.

Figure 17:
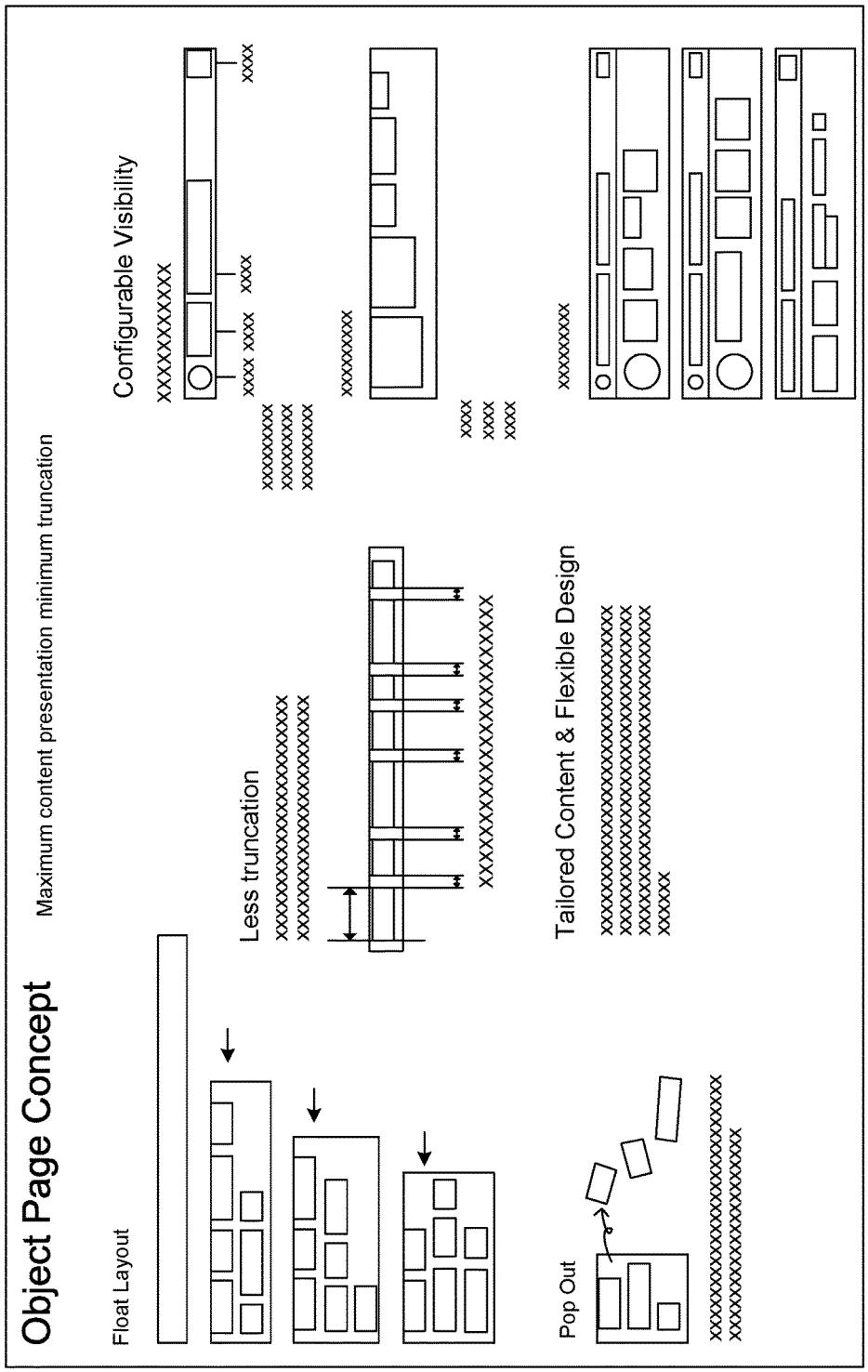
FIG. 17 is a pictorial illustration of visualization and behavior concepts (e.g., Float Layout, Pop out, Less Truncation, Tailored Content and Flexible Design, Configurable Visibility, Header Content and Tailored Content, etc.) that may be embodied in an object page layout in an example implementation of a common UI, in accordance with the principles of the present disclosure.

FIG. 17 pictorially shows visualization and behavior concepts 1700 (e.g., Float Layout, Pop out, Less Truncation, Tailored Content and Flexible Design, Configurable Visibility, Header Content and Tailored Content, etc.) that may be embodied in an object page layout in an example implementation of common UI 100, in accordance with the principles of the present disclosure.

Using the foregoing concepts, an object page may, for example, provide a flexible, extensible, and dynamically configurable overview facility through which a user may among other things create, edit, and view a range of business objects with inter alia the specific characteristics, particulars, etc. of a business object dynamically driving or directing behaviors such as for example data retrieval, data processing, display artifact rendering, etc.

Figure 18:
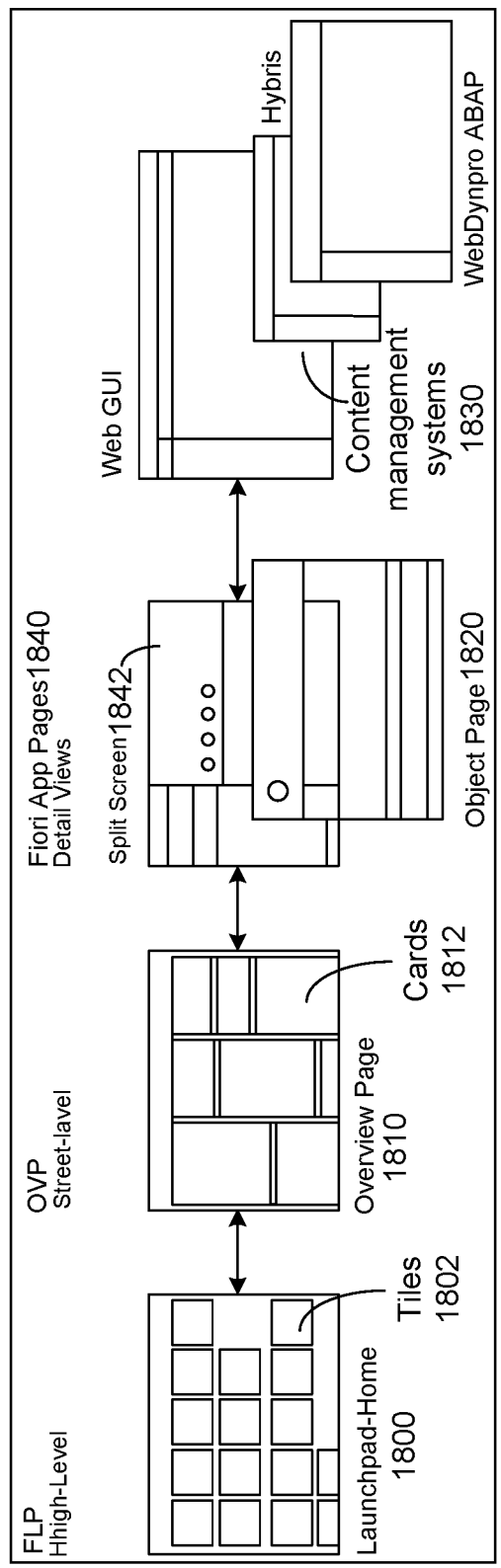
FIG. 18 is a schematic diagram which illustrates example relationships between component floorplans of a common UI that may be included or supported by an UI infrastructure, in accordance with the principles of the present disclosure.

FIG. 18 is a schematic diagram which shows example relationships between component floorplans of a common UI (e.g., common UI 1000) that may be included or supported by UI infrastructure 1134, in accordance with the principles of the present disclosure.

As shown in the FIG. 18, common UI 1000 may include a Launchpad 1800, in which multiple applications are represented by tiles and can be launched by activating the tiles (e.g., tile 1802). An application launched by activating a tile (e.g. tile 1802) may open an application page (e.g., application pages 1840) on the common UI (e.g., on an application page, a side panel, split screen (e.g., split screen 1842, etc.)). Application information and data for the multiple applications may be received for example, using content management services 1830 (e.g., WebGUI, Hybris, WebDynpro, etc.). In some instances, overview page 1810 may provide a user with an at-a-glance view of a set of the multiple applications (which may be relevant, for example, to the user's domain or role). The application information and data may be presented on cards (e.g., card 1812) in the overview page 1810. Each card 1812 may be bound only to a single application and may display application information and data for the single application retrieved, for example, using content management services 1830.

Object page 1820 may provide a flexible, extensible, and dynamically configurable overview facility through which a user may among other things create, edit, and view the objects (e.g., Launchpad 1800, tile 1802, overview page 1810, card 1812, application pages 1840, split screen 1842, etc.), with the specific characteristics and particulars (e.g., as shown in floorplans) of the objects driving or directing behaviors (e.g., data retrieval, data processing, display artifact rendering) of the objects.

Figure 19:
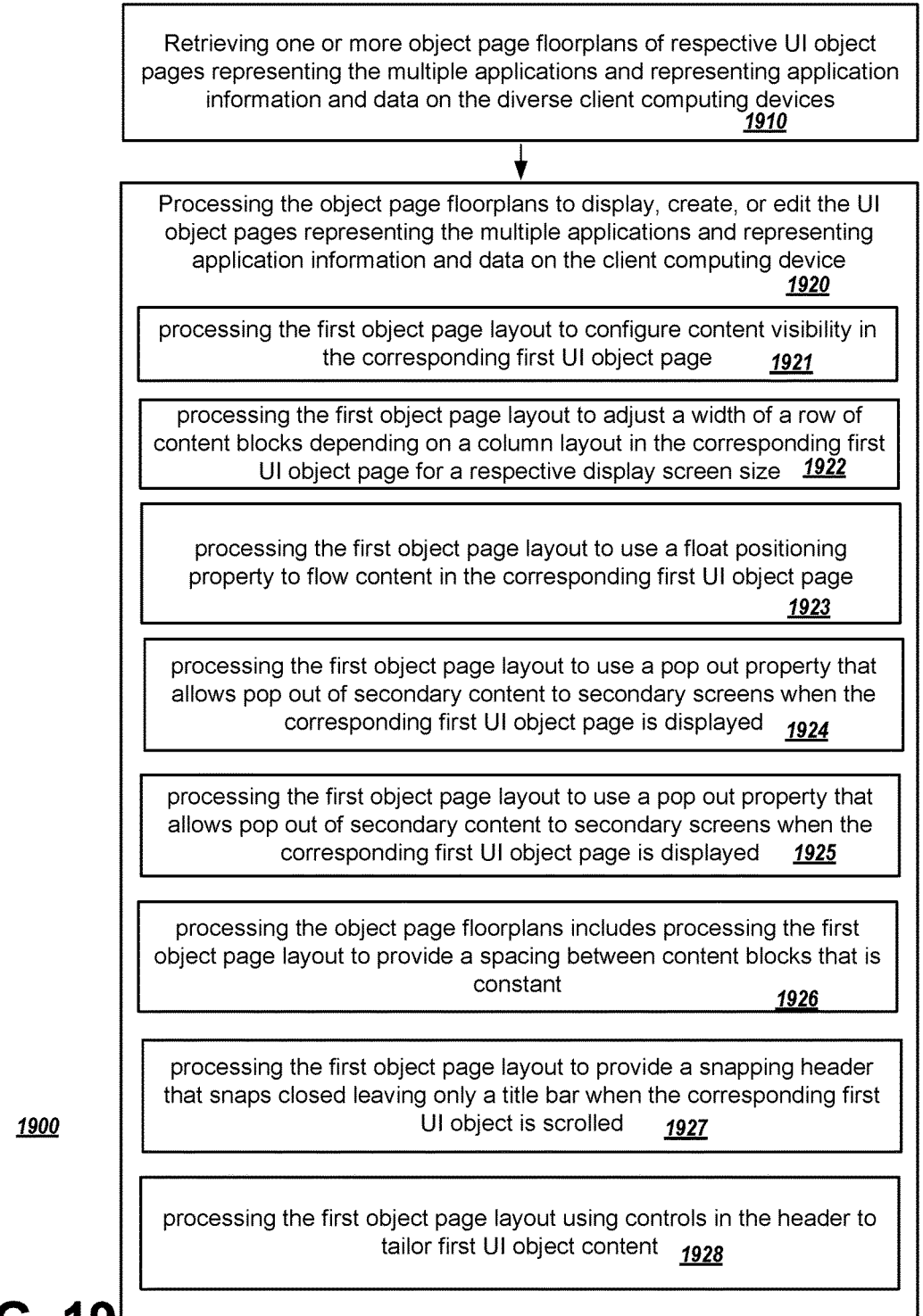
FIG. 19 is an illustration of an example method that includes presenting a common user interface (UI) of multiple applications as a web page on a client computing device, in accordance with the principles of the present disclosure.

FIG. 19 shows an example method 1900 for presenting a common user interface (UI) of multiple applications on diverse client computing devices as a web page that includes a set of UI elements leading to the multiple applications, the diverse client computing devices having display screens of diverse sizes, in accordance with the principles of the present disclosure.

Method 1900 includes retrieving one or more object page floorplans of respective UI object pages representing the multiple applications and representing application information and data on the diverse client computing devices (1910), and processing the object page floorplans to display, create, or edit the UI object pages representing the multiple applications and representing application information and data on the client computing device (1920). The object page floorplans include a first object page layout including a title bar, a header, an expanded default state, a navigation control, a content area, and a footer toolbar containing actions that are performed upon a corresponding first UI object page.

In method 1900, processing the object page floorplans 1920 includes processing the first object page layout to configure content visibility in the corresponding first UI object page (1921) and processing the first object page layout to adjust a width of a row of content blocks depending on a column layout in the corresponding first UI object page for a respective display screen size (1922)

Processing the object page floorplans 1920 may include processing the first object page layout to use a float positioning property to flow content in the corresponding first UI object page (1923), processing the first object page layout to use a pop out property that allows pop out of secondary content to secondary screens when the corresponding first UI object page is displayed (1924), and processing the first object page layout to provide a content block in the corresponding first UI object page with a flexible width that is self-adjusting to avoid truncation of content (1925).

Processing the object page floorplans 1920 includes processing the first object page layout to provide a spacing between content blocks that is constant (1926), processing the first object page layout to provide a snapping header that snaps closed leaving only a title bar when the corresponding first UI object is scrolled (1927), and processing the first object page layout using controls in the header to tailor first UI object content (1928).

In example implementations of method 1900, processing the first object page layout using controls in the header to tailor first UI object content 1928 may include using one or more of a variant management, object status, object number, text, link, label, button, tokenizer, rating indicator, progress indicator, icon, image, navigation control and form controls in the header to tailor first UI object content. Using the navigation control may provide at least one of anchor bar navigation, no navigation, and facet navigation in the corresponding first UI object. Further, in example implementations of method 1900, processing the first object page layout using controls in the header to tailor first UI object content 1928 may include using facets in the navigation control to navigate to one or more of dataset toolbar features, single dataset features, unassociated tables features, table and form features, master detail features, and form features in the corresponding first UI object.

Method 1900 may be implemented using, for example, system 1100.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable non-transitory storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

What is claimed is:

1. A system for presenting a common user interface (UI) of multiple applications on diverse client computing devices as a web page that includes a set of UI elements leading to the multiple applications, the diverse client computing devices having display screens of diverse sizes, the system comprising:
one or more backend servers hosting a UI infrastructure including the common UI and one or more object page floorplans of respective UI object pages representing the multiple applications and representing application information and data on the diverse client computing devices; and
one or more design tools to process the object page floorplans to display, create, or edit the UI object pages representing the multiple applications and representing application information and data on the client computing device, wherein the one or more design tools allow the user to create a customized UI environment tailored to user preference, wherein the customized UI environment comprises a plurality of content containers with a customized appearance and presentation, wherein the content containers are adjustable to fit within different display screens of the client computing devices, and wherein the content containers can display content from a plurality of different applications, and
wherein the object page floorplans include a first object page layout including a title bar, a header, an expanded default state, a navigation control, a content area, and a footer toolbar containing actions that are performed upon a corresponding first UI object page, wherein the header includes controls for tailoring the customized UI environment, wherein the content area includes content blocks that have a flexible width and are self-adjusting to avoid truncation of content, and wherein spacing between content blocks is constant and non-zero.

2. The system of claim 1, wherein the first object page layout has a configurable content visibility property.

3. The system of claim 1, wherein, in the first object page layout, a width of a row of content blocks depends on a column layout for a respective display screen size.

4. The system of claim 1, wherein the first object page layout has a float positioning property.

5. The system of claim 1, wherein the first object page layout has a pop out property that allows pop out of secondary content to secondary screens when the corresponding first UI object page is displayed.

6. The system of claim 1, wherein the header is a snapping header that snaps closed leaving only a title bar when the corresponding first UI object is scrolled.

7. The system of claim 1, wherein the header controls for tailoring UI object content include one or more of variant management, object status, object number, button, tokenizer, rating indicator, progress indicator, and form controls.

8. The system of claim 1, wherein the navigation control provides at least one of anchor bar navigation, no navigation, and facet navigation.

9. The system of claim 8, wherein the navigation control includes facets navigating to one or more of dataset toolbar features, single dataset features, unassociated tables features, table and form features, master detail features, and form features.

10. A method for presenting a common user interface (UI) of multiple applications on diverse client computing devices as a web page that includes a set of UI elements leading to the multiple applications, the diverse client computing devices having display screens of diverse sizes, the method comprising:
retrieving one or more object page floorplans of respective UI object pages representing the multiple applications and representing application information and data on the diverse client computing devices; and
processing, using one or more design tools, the object page floorplans to display, create, or edit the UI object pages representing the multiple applications and representing application information and data on the client computing device, wherein the one or more design tools allow the user to create a customized UI environment tailored to user preference, wherein the customized UI environment comprises a plurality of content containers with a customized appearance and presentation, wherein the content containers are adjustable to fit within different display screens of client computing devices, and wherein the content containers can display content from a plurality of different applications, and
wherein the object page floorplans include a first object page layout including a title bar, a header, an expanded default state, a navigation control, a content area, and a footer toolbar containing actions that are performed upon a corresponding first UI object page, wherein the header includes controls for tailoring the customized UI environment, wherein the content area includes content blocks that have a flexible width and are self-adjusting to avoid truncation of content, and wherein spacing between content blocks is constant and non-zero.

11. The method of claim 10, wherein processing the object page floorplans includes processing the first object page layout to configure content visibility in the corresponding first UI object page.

12. The method of claim 10, wherein processing the object page floorplans includes processing the first object page layout to adjust a width of a row of content blocks depending on a column layout in the corresponding first UI object page for a respective display screen size.

13. The method of claim 10, wherein processing the object page floorplans includes processing the first object page layout to use a float positioning property to flow content in the corresponding first UI object page.

14. The method of claim 10, wherein processing the object page floorplans includes processing the first object page layout to use a pop out property that allows pop out of secondary content to secondary screens when the corresponding first UI object page is displayed.

15. The method of claim 10, wherein processing the object page floorplans includes processing the first object page layout to provide a snapping header that snaps closed leaving only a title bar when the corresponding first UI object is scrolled.

16. The method of claim 10, wherein processing the object page floorplans includes processing the first object page layout using controls in the header that include one or more of variant management, object status, object number, button, tokenizer, rating indicator, progress indicator, and form controls in the header to tailor first UI object content.

17. The method of claim 16, wherein processing the object page floorplans includes processing the first object page layout using the navigation control to provide at least one of anchor bar navigation, no navigation, and facet navigation in the corresponding first UI object.

18. The method of claim 17, wherein processing the object page floorplans includes processing the first object page layout using facets in the navigation control to navigate to one or more of dataset toolbar features, single dataset features, unassociated tables features, table and form features, master detail features, and form features in the corresponding first UI object.

* * * * *